US012680946B2

(12) United States Patent
Ishihara

(10) Patent No.: US 12,680,946 B2
(45) Date of Patent: Jul. 14, 2026

(54) COLORIMETRIC SYSTEM, TERMINAL DEVICE, PROCESSING METHOD AND NON-TRANSITORY COMPUTER-READABLE STORAGE MEDIUM STORING PROGRAM

(71) Applicant: SEIKO EPSON CORPORATION, Tokyo (JP)

(72) Inventor: Masami Ishihara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 584 days.

(21) Appl. No.: 18/049,686

(22) Filed: Oct. 26, 2022

(65) Prior Publication Data

US 2023/0133321 A1 May 4, 2023

(30) Foreign Application Priority Data

Oct. 29, 2021 (JP) ................................ 2021-177438

(51) Int. Cl.
*G01N 21/25* (2006.01)
*G06F 3/14* (2006.01)

(52) U.S. Cl.
CPC ............. *G01N 21/251* (2013.01); *G06F 3/14* (2013.01)

(58) Field of Classification Search
CPC ..... G01N 21/251; G06F 3/14; H04N 1/00023
See application file for complete search history.

(56) References Cited

U.S. PATENT DOCUMENTS

| | | | |
|---|---|---|---|
| 10,436,645 B2 | 10/2019 | Fujino | |
| 2004/0223641 A1* | 11/2004 | Koyama | H04N 1/40012 |
| | | | 382/162 |
| 2007/0177237 A1* | 8/2007 | Sasanuma | G01J 3/462 |
| | | | 358/518 |
| 2018/0149521 A1 | 5/2018 | Fujino | |
| 2018/0252584 A1* | 9/2018 | Yamanoi | G01J 3/0275 |
| 2022/0294933 A1* | 9/2022 | Morimoto | H04N 1/6019 |

FOREIGN PATENT DOCUMENTS

| | | | |
|---|---|---|---|
| JP | 2005-061926 A | 3/2005 | |
| JP | 2006258683 | 9/2006 | |
| JP | 2008083003 A * | 4/2008 | G01B 11/24 |
| JP | 2008182691 | 8/2008 | |
| JP | 2011-141253 A | 7/2011 | |
| JP | 2014036351 A * | 2/2014 | |
| JP | 2018088615 | 6/2018 | |
| JP | 2019213024 A * | 12/2019 | |

* cited by examiner

*Primary Examiner* — Yossef Korang-Beheshti
(74) *Attorney, Agent, or Firm* — WORKMAN NYDEGGER

(57) ABSTRACT

A colorimetric system includes a comparison processing unit that performs a process of a comparison between a color value of a color that was subjected to colorimetry by a colorimetric unit that performs colorimetry and a color value of a reference color, wherein the comparison processing unit performs a display process of making notification of a comparison processing result and a color to be subjected to colorimetry next that is a color that is not subjected to colorimetry.

10 Claims, 27 Drawing Sheets

FIG. 15

| COMMAND NAME | COMMAND CONTENT |
|---|---|
| FIRST COLORIMETRY TARGET COMMAND | DISPLAY COLOR THAT IS NOT SUBJECTED TO COLORIMETRY IN REFERENCE COLOR REGION |
| SECOND COLORIMETRY TARGET COMMAND | DISPLAY END ICON IN CENTER |

COLORIMETRIC SYSTEM, TERMINAL DEVICE, PROCESSING METHOD AND NON-TRANSITORY COMPUTER-READABLE STORAGE MEDIUM STORING PROGRAM

The present application is based on, and claims priority from JP Application Serial Number 2021-177438, filed Oct. 29, 2021, the disclosure of which is hereby incorporated by reference herein in its entirety.

BACKGROUND

1. Technical Field

The present disclosure relates to a colorimetric system, a terminal device, a processing method, a non-transitory computer-readable storage medium storing a program, and the like.

2. Related Art

In the related art, a colorimeter that performs colorimetry on a color patch such as a color test pattern of a printing apparatus is known. JP-A-2005-061926 discloses a technique in which the user performs colorimetry on a desired line in a color patch, it is determined whether the number of colorimetry data and the number of color patches match, and when they do not match, the user is notified that the colorimetry data is not valid.

In the technique described in JP-A-2005-061926, when the user does not perform colorimetry on the correct color patch line, the data on which colorimetry is performed is discarded and what the user can do is to repeat the colorimetry. A technique in which, for example, a color that is not subjected to colorimetry is searched for and the user is notified of the searched color is not offered.

SUMMARY

According to an aspect of the present disclosure, a colorimetric system includes a comparison processing unit that performs a process of a comparison between a color value of a color that was subjected to colorimetry by a colorimetric unit that performs colorimetry and a color value of a reference color and a display processing unit that displays the comparison processing result by the comparison processing unit, wherein the comparison processing unit searches for a color that is not subjected to colorimetry among colors included in a color group, and when there is the color that is not subjected to colorimetry, determines the color that is not subjected to colorimetry as a color to be subjected to colorimetry next, and the display processing unit performs a display process of displaying the color to be subjected to colorimetry next.

According to another aspect of the present disclosure, a terminal device includes a terminal comparison processing unit that performs a process of a comparison between a color value of a color that was subjected to colorimetry by a colorimeter that performs colorimetry and a color value of a reference color and a terminal display processing unit that displays the comparison processing result by the terminal comparison processing unit, wherein the terminal comparison processing unit searches for a color that is not subjected to colorimetry among colors included in a color group, and when there is the color that is not subjected to colorimetry, determines the color that is not subjected to colorimetry as a color to be subjected to colorimetry next, and the terminal display processing unit performs a process of displaying the color to be subjected to colorimetry next.

According to still another aspect of the present disclosure, a processing method includes performing a process of a comparison between a color value of a color that was subjected to colorimetry by a colorimetric unit performing colorimetry and a color value of a reference color, performing a process of displaying the comparison processing result by the comparison processing, performing a process of searching for a color that is not subjected to colorimetry among colors included in a color group and when there is the color that is not subjected to colorimetry, determining the color that is not subjected to colorimetry as a color to be subjected to colorimetry next, and performing a display process of displaying the color to be subjected to colorimetry next.

According to still another aspect of the present disclosure, in a non-transitory computer-readable storage medium storing a program, the program causes a computer to execute as a comparison processing unit that performs a process of a comparison between a color value of a color that was subjected to colorimetry by a colorimetric unit that performs colorimetry and a color value of a reference color and a display processing unit that displays the comparison processing result by the comparison processing unit, wherein the comparison processing unit searches for a color that is not subjected to colorimetry among colors included in a color group, and when there is the color that is not subjected to colorimetry, determines the color that is not subjected to colorimetry as a color to be subjected to colorimetry next, and the display processing unit performs a display process of displaying the color to be subjected to colorimetry next.

BRIEF DESCRIPTION OF THE DRAWINGS

FIG. 15 is a diagram showing a colorimetry target command.

DESCRIPTION OF EXEMPLARY EMBODIMENTS

Hereinafter, the present embodiment will be described. The present embodiments described below do not unduly limit the details of the present disclosure described in the claims. Moreover, not all of the configurations described in the present embodiment are essential constituent requirements of the present disclosure.

Figure 1:
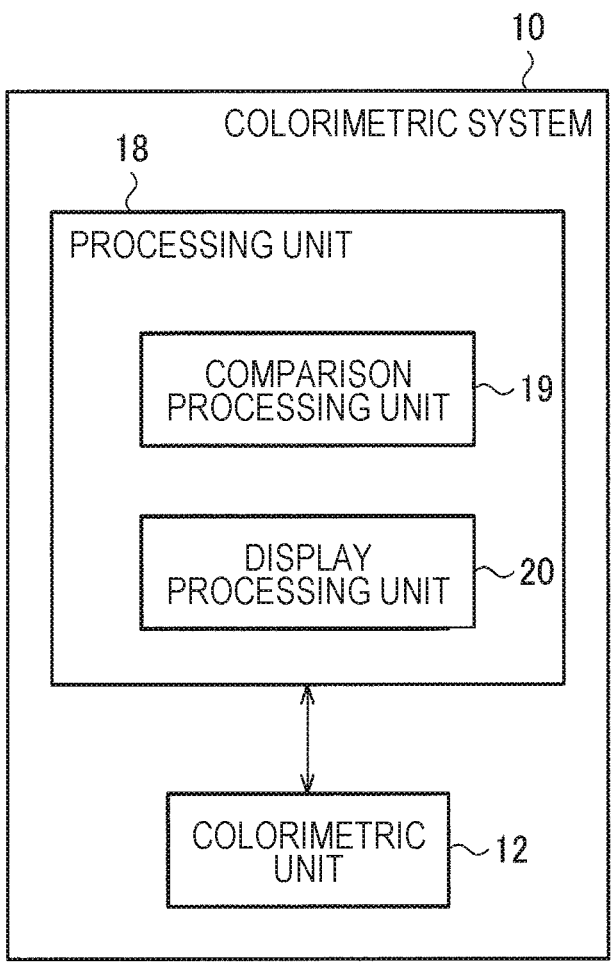
FIG. 1 is a block diagram showing a configuration example of a colorimetric system according to the present embodiment.

FIG. 1 is a block diagram showing a configuration example of a colorimetric system 10 of the present embodiment. The colorimetric system 10 of the present embodiment includes a colorimetric unit 12 and a processing unit 18. The processing unit 18 includes a comparison processing unit 19 and a display processing unit 20. The colorimetric system 10 can be achieved by, for example, a terminal device 60 described later, but may be achieved by the terminal device 60 and a colorimeter 30 described later. Further, the colorimetric system 10 can be achieved in various forms such as connecting the colorimeter 30 to cloud computing by communication.

The colorimetric unit 12 performs colorimetry. Specifically, the colorimetric unit 12 perform colorimetry of the target color printed on the print medium to output the color value which is the colorimetry result. The function of the colorimetric unit 12 can be implemented by a colorimetry sensor or the like. An example of the colorimetry sensor may include a spectroscopic sensor. For example, the colorimetry sensor may include a spectroscopic sensor such as micro electro mechanical systems (MEMS), that can be collectively produced in a wafer level process. The spectroscopic sensor is, for example, a sensor that measures a reflected spectral spectrum. Specifically, the spectroscopic sensor includes a light source including, for example, an LED, an optical filter that receives light, from the light source, reflected on the measurement face and that selects and switches the wavelengths, and a light receiving device that measures the amount of light of reflected light passing through the optical filter. An example of the optical filter may include an etalon or the like, which is a wavelength filter utilizing the multiple interference of two opposing reflection faces. The spectroscopic sensor measures the reflected spectral spectrum in which the amount of reflected light at each wavelength of the reflected light is measured, thereby performing colorimetry of the target color. The colorimetry sensor that achieves the colorimetric unit 12 is not limited to such a spectroscopic sensor, but may be achieved by, for example, an image sensor. Further, the colorimetric unit 12 may perform colorimetry on not only the reflected light but also the transmitted light.

The processing unit 18 controls respective units of the colorimetric system 10. The function of the processing unit 18 may be implemented by the processor or the like of a processing unit 62 of the terminal device 60 described later, may be implemented by the processor or the like of a processing unit 32 of the colorimeter 30 described later, or may be implemented by both, and details will be described later. The processing unit 18 performs each process of the present embodiment based on the program of the present embodiment. This program is a program that causes a computer to function as each unit of the present embodiment. A computer is a device including, for example, an operation unit, a processing unit, a storage unit, and an output unit. For example, the program of the present embodiment is a program that causes a computer to function as the comparison processing unit 19 and the display processing unit 20. This program is stored, for example, in an information storage medium. That is, the colorimetric system 10 of the present embodiment can perform each process of the present embodiment based on the program stored in the information storage medium. An information storage medium, which is a medium that can be read by a computer, stores programs, data, and the like, and its function can be implemented by an optical disk, a hard disk device (HDD), a semiconductor memory, and the like.

The comparison processing unit 19 performs a process of a comparison between the color value of the color that was subjected to colorimetry by the colorimetric unit 12 and the color value of the reference color. For example, the comparison processing unit 19 compares the color that was subjected to colorimetry with the reference color, which is the color to be compared, with respect to the first to N-th colors where N is an integer of 2 or more, and determines whether they match. The fact that the color that was subjected to colorimetry and the reference color match means satisfying the allowable condition for color matching. The allowable conditions can be set in various ways. For example, the comparison processing unit 19 determines that the color that was subjected to colorimetry and the reference color match when a color difference $\Delta E$ between the color that was subjected to colorimetry and the reference color is smaller than a given value. The allowable conditions may be another condition for the color difference $\Delta E$, a condition for the environmental light source, a condition for each color component, and a condition for the reflected spectral spectrum. Moreover, the combination of these conditions may be an allowable condition. The comparison process may be performed in the spot colorimetry mode in which colorimetry is performed on a spot basis, or in the line colorimetry mode in which when a plurality of colors that is to be subjected to colorimetry is arranged in a line, colorimetry of the plurality of colors is collectively performed on a line basis. When the colorimetry by the spot colorimetry mode is performed N times, N reference colors are required as in the case of the colorimetry by the line colorimetry mode, but the colorimetric system 10 of the present embodiment can store N reference colors as one group in a storage unit (not shown). In the following description, a group consisting of N reference colors stored in a storage unit (not shown) is referred to as a color group.

Based on the program of the present embodiment, the display processing unit 20 performs a display process in response to the processing performed by the processing unit 18 including the comparison processing unit 19. For example, at the timing when the comparison processing unit 19 acquires the colorimetry value data, the display processing unit 20 displays the color data based on the acquired colorimetry value data on a display unit (not shown in FIG. 1). Specifically, the display unit may be, for example, a display unit 68 of the terminal device 60 described later, a display unit 38 of the colorimeter 30 described later, or another display device. In the present embodiment and the modifications described later, a screen example displayed on the display unit 68 as a representative is shown. In the following description, the colorimetry value data may be simply referred to as a color value, and the color data may be simply referred to as a color.

It should be noted that the configuration of the colorimetric system 10 of the present embodiment is not limited to this, but various modifications such as adding other configurations can be implemented. The colorimetric system 10 may further include, for example, a communication unit (not shown in FIG. 1). The communication unit (not shown) here is a communication interface that performs wireless or wired communication with, for example, an external device, and the function thereof can be implemented by, for example, hardware such as a communication application specific integrated circuit (ASIC) or a communication processor, or communication firmware. The communication unit (not shown) communicates with an external device by short-range wireless communication such as Bluetooth (registered trademark), but may communicate with other standards such as Wi-Fi (registered trademark) and USB. For example, when the colorimetric system 10 includes the terminal device 60 and the colorimeter 30 described later, the terminal device 60 includes a communication unit 69 described later as the communication unit (not shown), and the colorimeter 30 includes a communication unit 39 described later as the communication unit (not shown), so that the terminal device 60 can receive the color value from the colorimeter 30.

Figure 2:
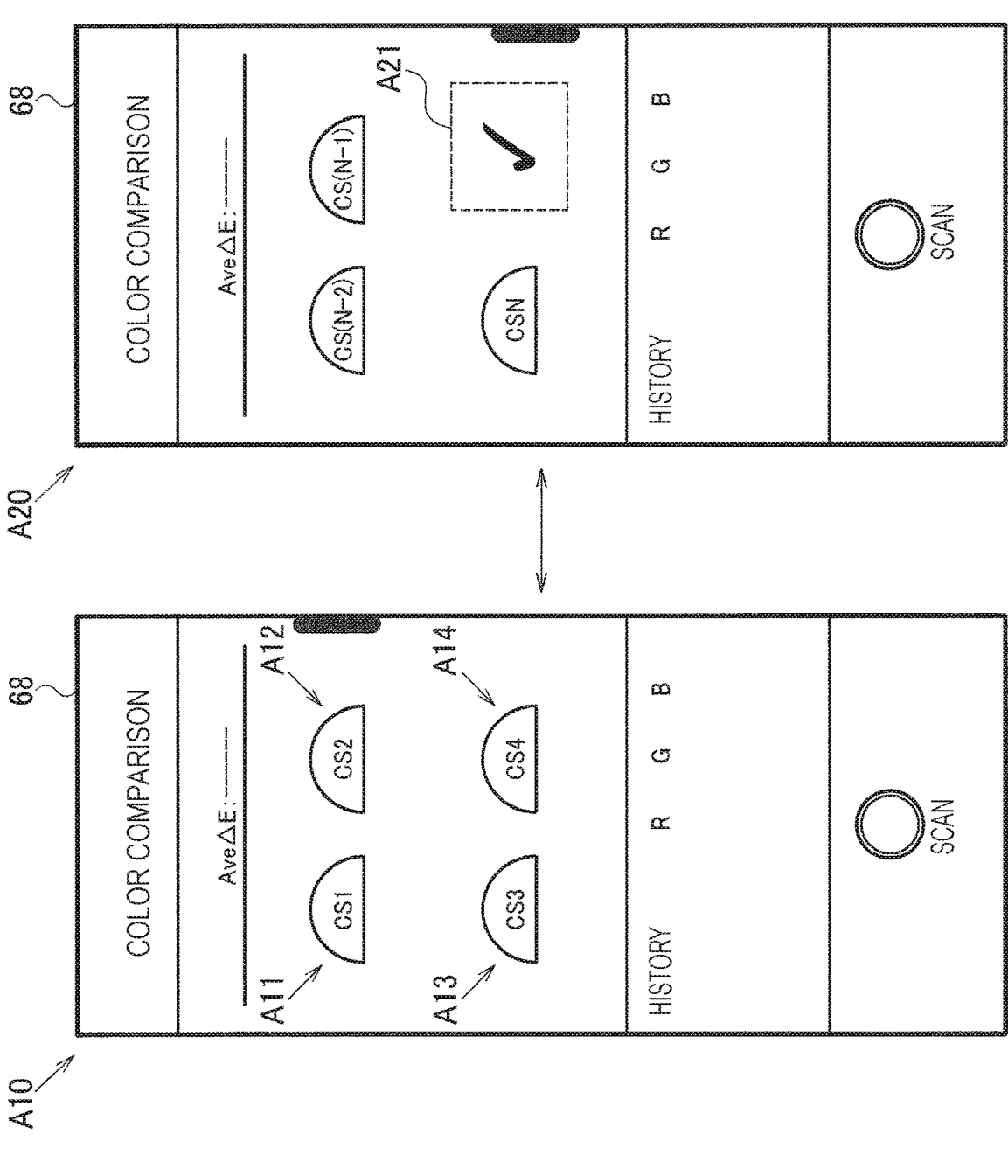
FIG. 2 is a diagram showing a screen example of spot colorimetry.
Figure 3:
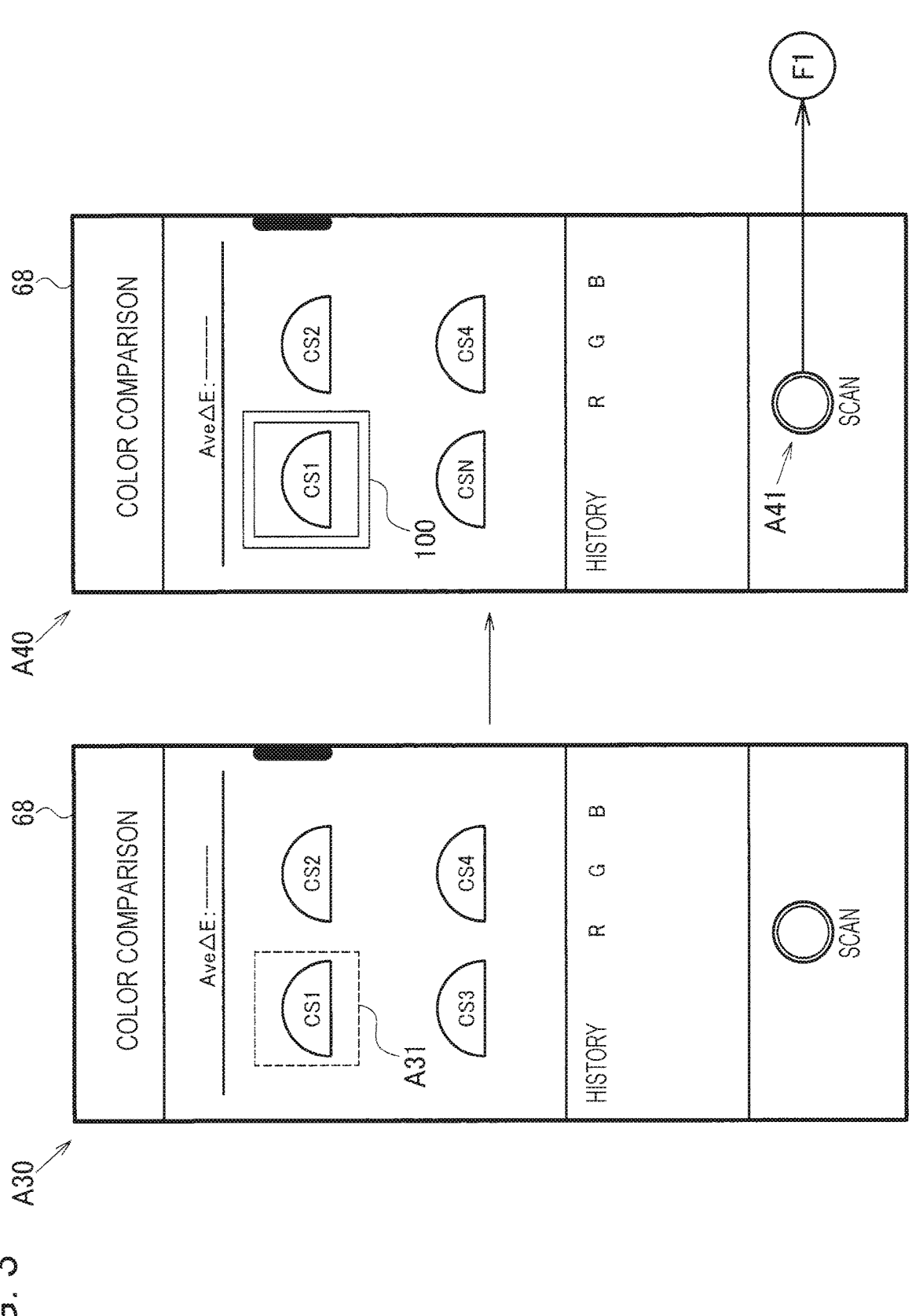
FIG. 3 is another diagram showing an example of a screen for spot colorimetry.
Figure 4:
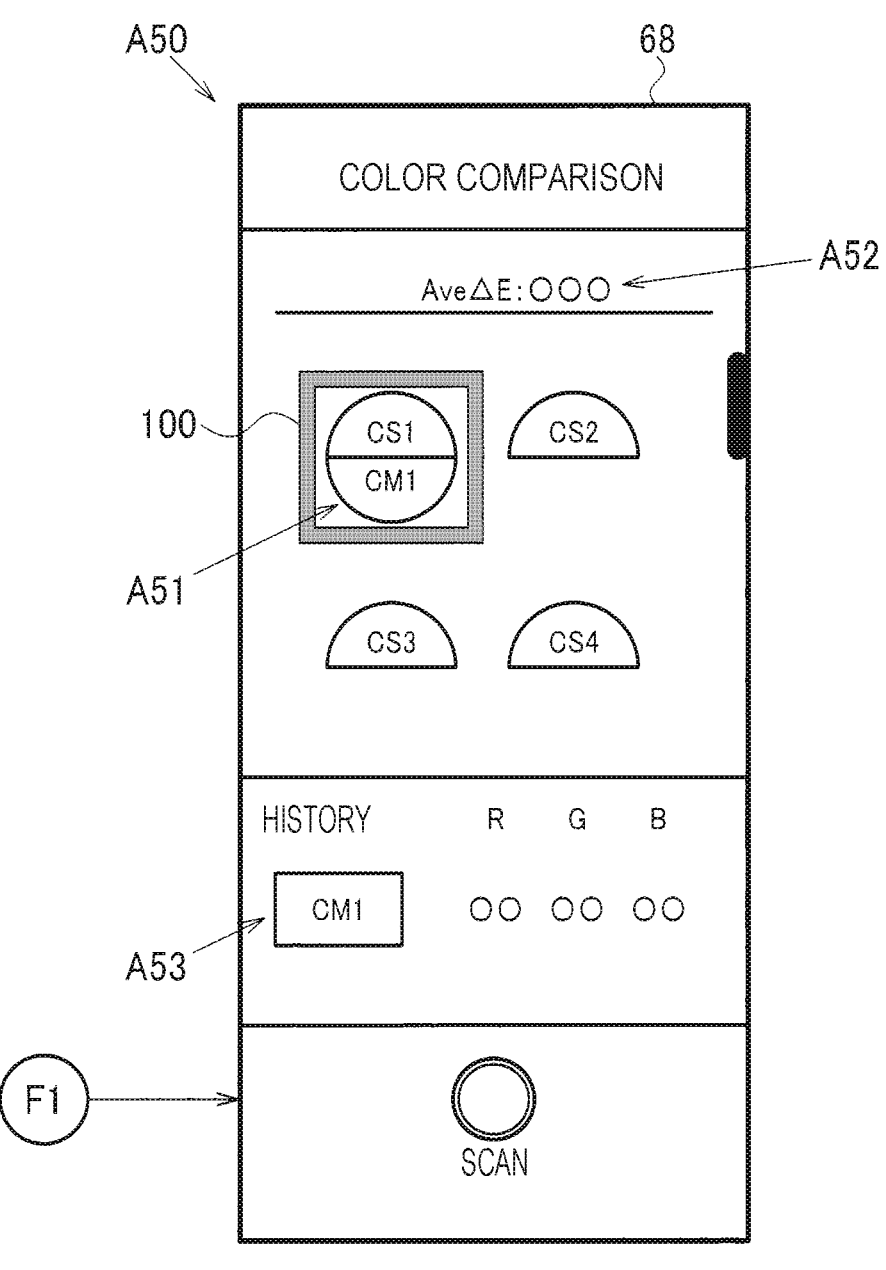
FIG. 4 is another diagram showing an example of a screen for spot colorimetry.

A screen example by the colorimetric system 10 of the present embodiment will be described with reference to FIGS. 2, 3, and 4. FIGS. 2 to 4 are screen examples when the colorimetry application program in the spot colorimetry mode is started. For example, color CS1, color CS2, color CS3, color CS4, . . . , Color CS(N−2), color CS(N−1), and color CSN, as reference colors, are stored as one color group in a storage unit (not shown in FIG. 1). The screen examples in FIGS. 2 to 4 show an example of displaying colors on the display unit 68 of the terminal device 60 described later, but the present disclosure is not limited to this, and for example, colors may be displayed on the display unit 38 of the colorimeter 30 described later or may be displayed on another display device. Further, in the following description, in the color group of the present embodiment, the color CS1 is a color at the head in the color group, and the color CSN is a color at the end in the color group.

The display processing unit 20 displays respective reference colors included in the color group as icons. When the number of reference colors included in the color group is large, it is not necessary to display all the icons on one screen. For example, when the user scrolls the screen of A10 in FIG. 2, the display processing unit 20 may display the screen indicated by A20. On the screen indicated by A10 in FIG. 2, for example, as indicated by A11, a color filled icon in a semicircle in the upward direction is displayed in a color indicating an outline of the color CS1. In the following description, the color or the like indicating the outline of the color CS1 may be simply referred to as the color CS1 or the like. Further, the icon or the like filled with the color CS1 may be simply referred to as an icon or the like including the color CS1 or an icon or the like of the color CS1. Similarly, the icon including the color CS2 indicated by A12, the icon including the color CS3 indicated by A13, and the icon including the color CS4 indicated by A14 are displayed on the screen of A10. Similarly, for example, the icon including the color CS(N−2), the icon including the color CS(N−1), the icon including the color CSN, and the end icon indicated by A21 are displayed on the screen indicated by A20. As described above, in the example in FIG. 2, while displaying the screen indicated by A10, the user cannot visually recognize the icon including the color CS(N−2), the icon including the color CS(N−1), the icon including the color CSN, and the end icon. Similarly, while displaying the screen indicated by A20, the user cannot visually recognize the icon including the color CS1, the icon including the color CS2, the icon including the color CS3, and the icon including the color CS4.

Next, a screen example when spot colorimetry is performed will be described. When the user selects the region including the icon of the color CS1 surrounded by the dotted line of A31 in the screen example indicated by A30 in FIG. 3, a cursor icon 100 is displayed to surround the icon including the color CS1 as in the screen example indicated by A40. Then, when the user selects the colorimetry button icon indicated by A41, spot colorimetry is performed and the screen is displayed as indicated by the screen example indicated by A50 in FIG. 4. In the screen example of the A50, as indicated by A51, the semicircular icon in the downward direction including the color CM1 that was actually subjected to colorimetry is displayed inside the cursor icon 100. Further, inside the cursor icon 100, one circular icon is formed by the icon including the color CS1 and the icon including the color CM1. As a result, the user recognizes that the spot colorimetry with the color CS1 as the reference color was performed. Then, in a case in which it is desired to perform spot colorimetry with another color as a reference color, when the user selects an icon including the desired reference color, the cursor icon 100 is moved from the position surrounding the icon including the color CS1 and the like to the position surrounding the icon selected this time. This allows the user to perform similar colorimetry. In other words, spot colorimetry with another color as a reference color will not be performed unless the user newly selects an icon including the color corresponding to another reference color. When the user selects the end icon indicated by A21 in FIG. 2, the spot colorimetry application program ends.

Figure 5:
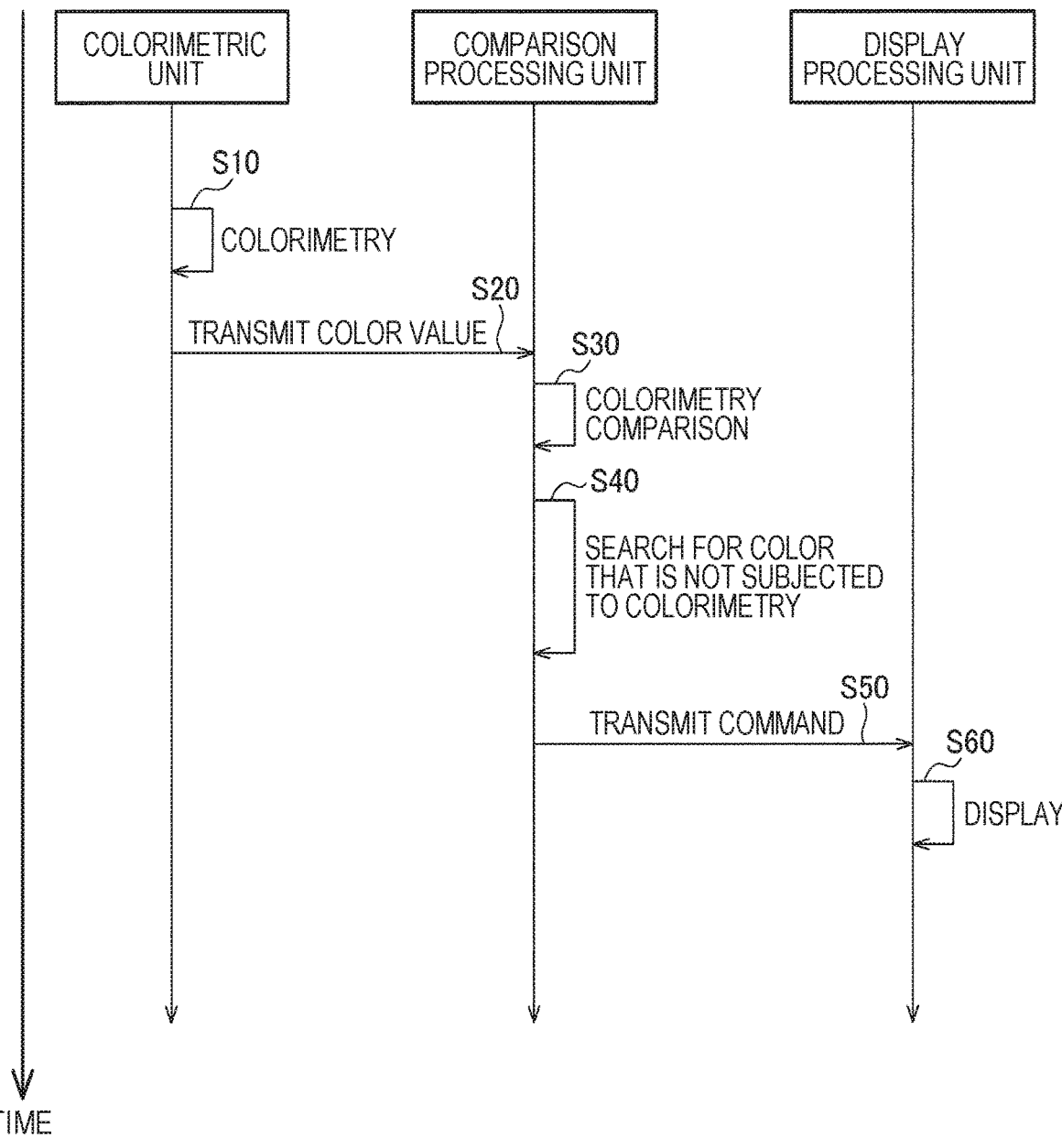
FIG. 5 is a diagram showing a flow of processing according to the present embodiment.

FIG. 5 is a diagram showing a flow of processing according to the technique of the present embodiment. The colorimetric unit 12 performs colorimetry (step S10) to transmit the color value to the comparison processing unit 19 (step S20). After performing colorimetry comparison (step S30), the comparison processing unit 19 determines the content to be displayed to transmit a command corresponding to the content to the display processing unit 20 (step S50). The display processing unit 20 performs display (step S60) based on the received command. Further, the comparison processing unit 19 may further perform a process (step S40) of searching for a color that is not subjected to colorimetry in a predetermined case. The predetermined case is, for example, a case where colorimetry is performed based on the reference color at the end in the color group. For example, the number of colorimetry completion flags same as the number of reference colors is prepared, the colorimetry completion flag is ON for the reference color for which colorimetry was performed, it is determined whether each colorimetry completion flag is ON, so that the process of step S40 can be achieved. In the following description, the process or the like of step S40 may be simply referred to as step S40 or the like. The same applies to the other steps.

Figure 6:
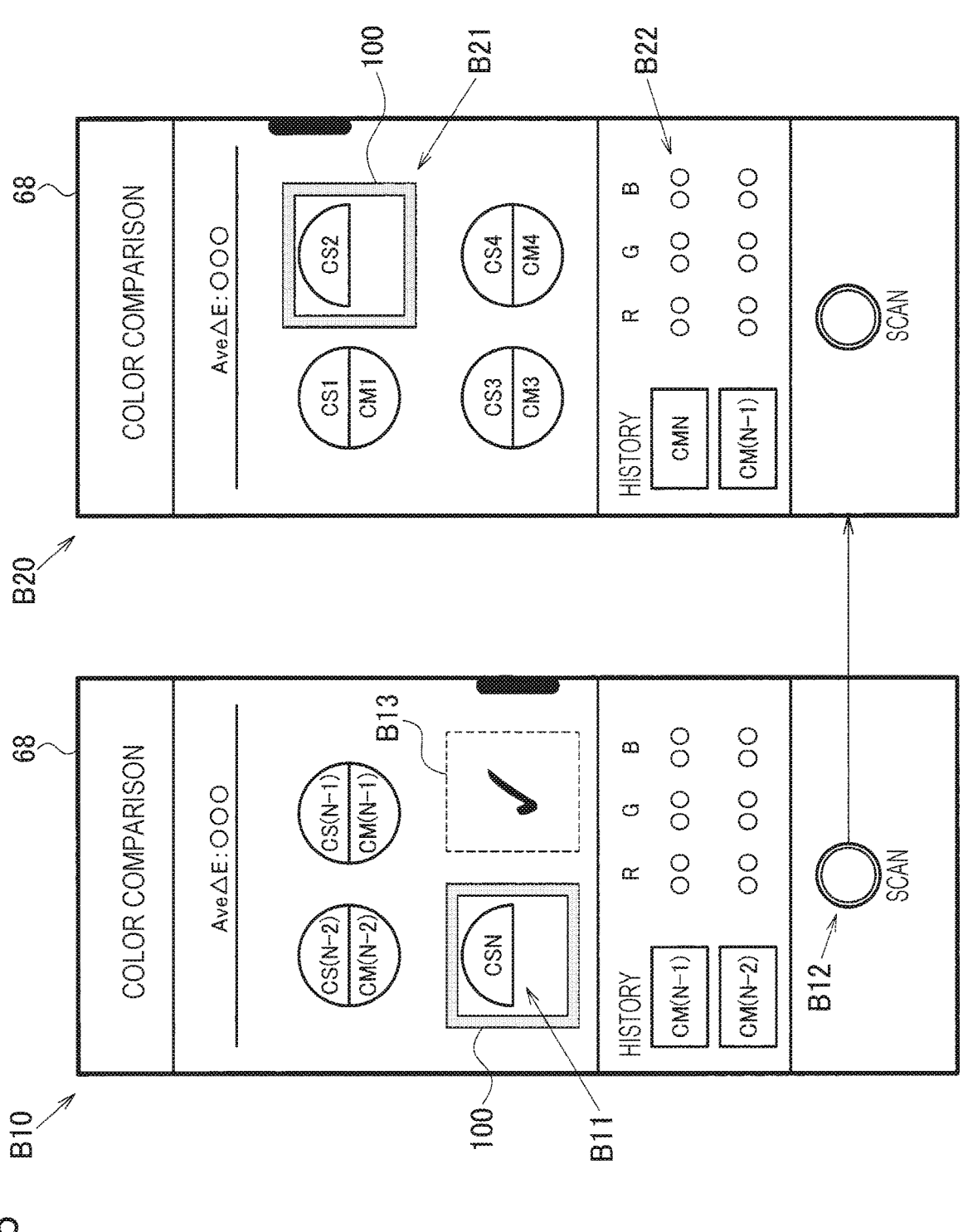
FIG. 6 is a diagram showing a screen example of spot colorimetry to which the technique of the present embodiment is applied.

FIG. 6 is a diagram showing a screen example when the process in FIG. 5 is applied. The example in FIG. 6 is the same as the example in FIG. 2 in that the number of reference colors is N and the user cannot visually recognize all the reference colors on one screen, but is different in that the user forgets the spot colorimetry with the color CS2 as the reference color.

For example, as shown on the screen of B10, the user performs spot colorimetry with the color CS(N-2) as a reference color and performs spot colorimetry with the color CS(N-1) as a reference color, and selects a region indicated by B11 to display the cursor icon 100 so as to surround the icon including the color CSN. Then, it is assumed that the user selects the colorimetry button icon indicated by B12 and performs spot colorimetry with the color CSN as a reference color. At this time, the comparison processing unit 19 determines that the spot colorimetry with the color CS2 as a reference color is not performed according to the above-mentioned step S40, and transmits the command of displaying the screen indicated by B20 described later according to the above-mentioned step S50. As a result, the display processing unit 20 displays the cursor icon 100 so as to surround the icon including the color CS2, as indicated by B21 according to step S60. That is, the user visually recognizes the automatic transition from the screen of B10 to the screen of B20 by performing spot colorimetry with the color CSN as a reference color. As indicated by B22, the color value related to the color CMN that was subjected to colorimetry is displayed.

As described above, the colorimetric system 10 of the present embodiment includes the comparison processing unit 19 that performs a process of a comparison between the color value of the color that was subjected to colorimetry by the colorimetric unit 12 that performs colorimetry and the color value of the reference color and the display processing unit 20 that displays the comparison processing result by the comparison processing unit 19. The comparison processing unit 19 searches for a color that is not subjected to colorimetry among colors included in the color group, and when there is the color that is not subjected to colorimetry, determines the color that is not subjected to colorimetry as a color to be subjected to colorimetry next, and the display processing unit 20 performs a display process of displaying the color to be subjected to colorimetry next. As described above, since the colorimetric system 10 of the present embodiment includes the comparison processing unit 19 and the display processing unit 20, it is possible to display the result of a comparison between the color that was subjected to colorimetry by the colorimetric unit 12 and the reference color. Further, the comparison processing unit 19 searches for a color that is not subjected to colorimetry among colors included in the color group, and when there is the color that is not subjected to colorimetry, the color that is not subjected to colorimetry is determined as a color to be subjected to colorimetry next. Therefore, when the user forgets to perform colorimetry of some colors in the color group, the user can be prompted to perform colorimetry of the colors that are not subjected to colorimetry. Further, since the display processing unit 20 performs a display process of displaying the color to be subjected to colorimetry next, the user can recognize the color that is not subjected to colorimetry. For example, in the example in FIG. 6, the user cannot visually recognize the icon including the color CS2 when performing the spot colorimetry with the color CSN as a reference color. As a result, when the user forgets the spot colorimetry with the color CS2 as a reference color, there is a high possibility that the end icon indicated by B13 will be selected after performing spot colorimetry with the color CSN as a reference color. In this respect, by applying the technique of the present embodiment, after the user performs spot colorimetry with the color CSN that is a color at the end in the color group as a reference color, the cursor icon 100 is displayed so as to surround an icon including the color CS2 which is a color that is not subjected to colorimetry, so that the user can reliably perform spot colorimetry with all the colors included in the color group as reference colors. Such a technique of the colorimetric system 10 has not been proposed so far.

Moreover, the technique of the present embodiment may be achieved as a processing technique. That is, the processing method of the present embodiment includes a comparison process of comparing the color value of the color that was subjected to colorimetry by the colorimetric unit 12 that performs colorimetry with the color value of the reference color, a display process of displaying the comparison processing result by the comparison process, a process of searching for a color that is not subjected to colorimetry among colors included in the color group, and when there is the color that is not subjected to colorimetry, determining the color that is not subjected to colorimetry as the color to be subjected to colorimetry next, and a display process of displaying the color to be subjected to colorimetry next. By doing so, the same effect as described above can be obtained.

Moreover, the technique of the present embodiment may be achieved as a program. That is, the program of the present embodiment causes the computer to activate as the comparison processing unit 19 that performs a process of a comparison between the color value of the color that was subjected to colorimetry by the colorimetric unit 12 that performs colorimetry and the color value of the reference color, and the display processing unit 20 that displays the comparison processing result by the comparison processing unit 19. The comparison processing unit 19 searches for a color that is not subjected to colorimetry among colors included in the color group, and when there is the color that is not subjected to colorimetry, determines the color that is not subjected to colorimetry as a color to be subjected to colorimetry next, and the display processing unit 20 performs a display process of displaying the color to be subjected to colorimetry next. By doing so, the same effect as described above can be obtained.

The technique of the present embodiment can also be achieved as the terminal device 60 described later in FIG. 8 and the like. That is, the terminal device 60 of the present embodiment includes a terminal comparison processing unit 65 that performs a process of a comparison between the color value of the color that was subjected to colorimetry by the colorimeter 30 that performs colorimetry and the color value of the reference color and a terminal display processing unit 67 that displays the comparison processing result by the terminal comparison processing unit 65. The terminal comparison processing unit 65 searches for a color that is not subjected to colorimetry among colors included in the color group, and when there is the color that is not subjected to colorimetry, determines the color that is not subjected to colorimetry as a color to be subjected to colorimetry next, and the terminal display processing unit 67 performs a process of displaying the color to be subjected to colorimetry next. By doing so, the same effect as described above can be obtained.

Figure 7:
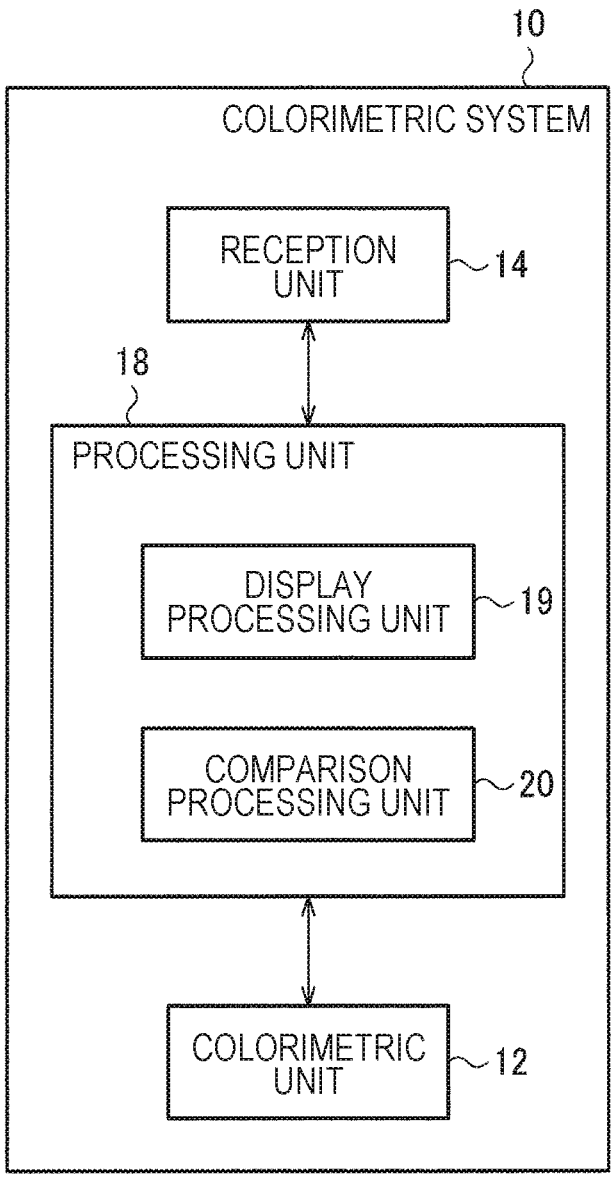
FIG. 7 is a block diagram showing another configuration example of a colorimetric system.

It should be noted that the colorimetric system 10 of the present embodiment is not limited to the one described above, but various modifications such as adding other components can be implemented. For example, the colorimetric system 10 of the present embodiment may be a configuration example indicated by the block diagram in FIG. 7. The configuration example in FIG. 7 is different from the configuration example in FIG. 1 in that a reception unit 14 is further included to the configuration example in FIG. 1. The reception unit 14 receives an operation from the user. Specifically, the operation from the user is, for example, in addition to the operation for displaying the cursor icon 100 so as to surround the icon including the color to be subjected to colorimetry as described above, a predetermined operation or the like that allows the color to be subjected to colorimetry next to be selected when the color to be subjected to colorimetry further next is displayed, for example, in the modification described later. That is, the colorimetric system 10 of the present embodiment includes the reception unit 14 that receives an operation from the user, and when the reception unit 14 is displaying the color to be subjected to colorimetry next, the reception unit 14 receives a predetermined operation that allows the color to be subjected to colorimetry further next to be selected. By doing so, the user can reselect the color to be subjected to colorimetry next even when the color to be subjected to colorimetry next is determined once. This makes it possible to improve the convenience of the colorimetric system 10.

Figure 8:
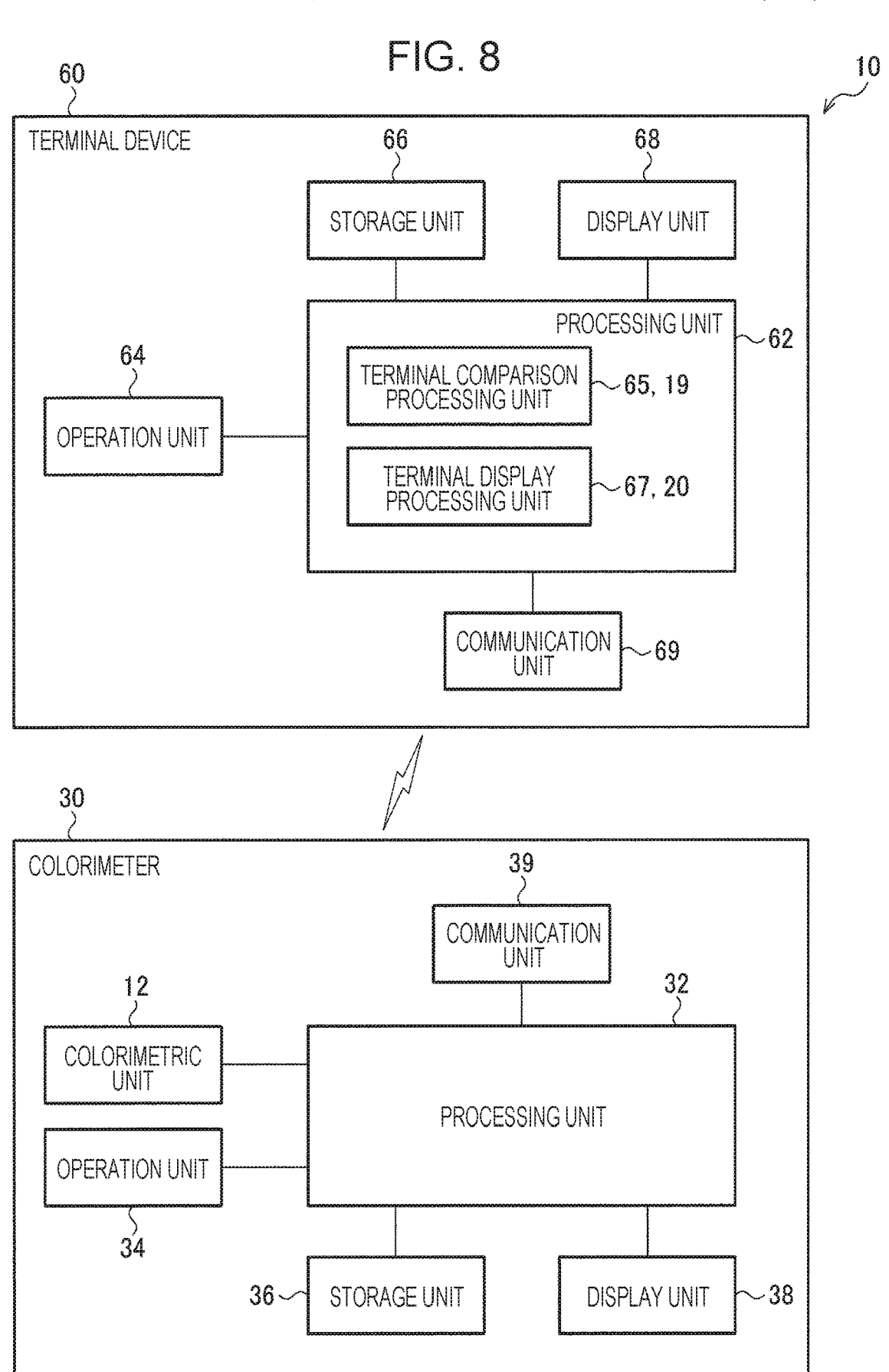
FIG. 8 is a block diagram showing a configuration example of a terminal device and a colorimeter as a colorimetric system.
Figure 9:
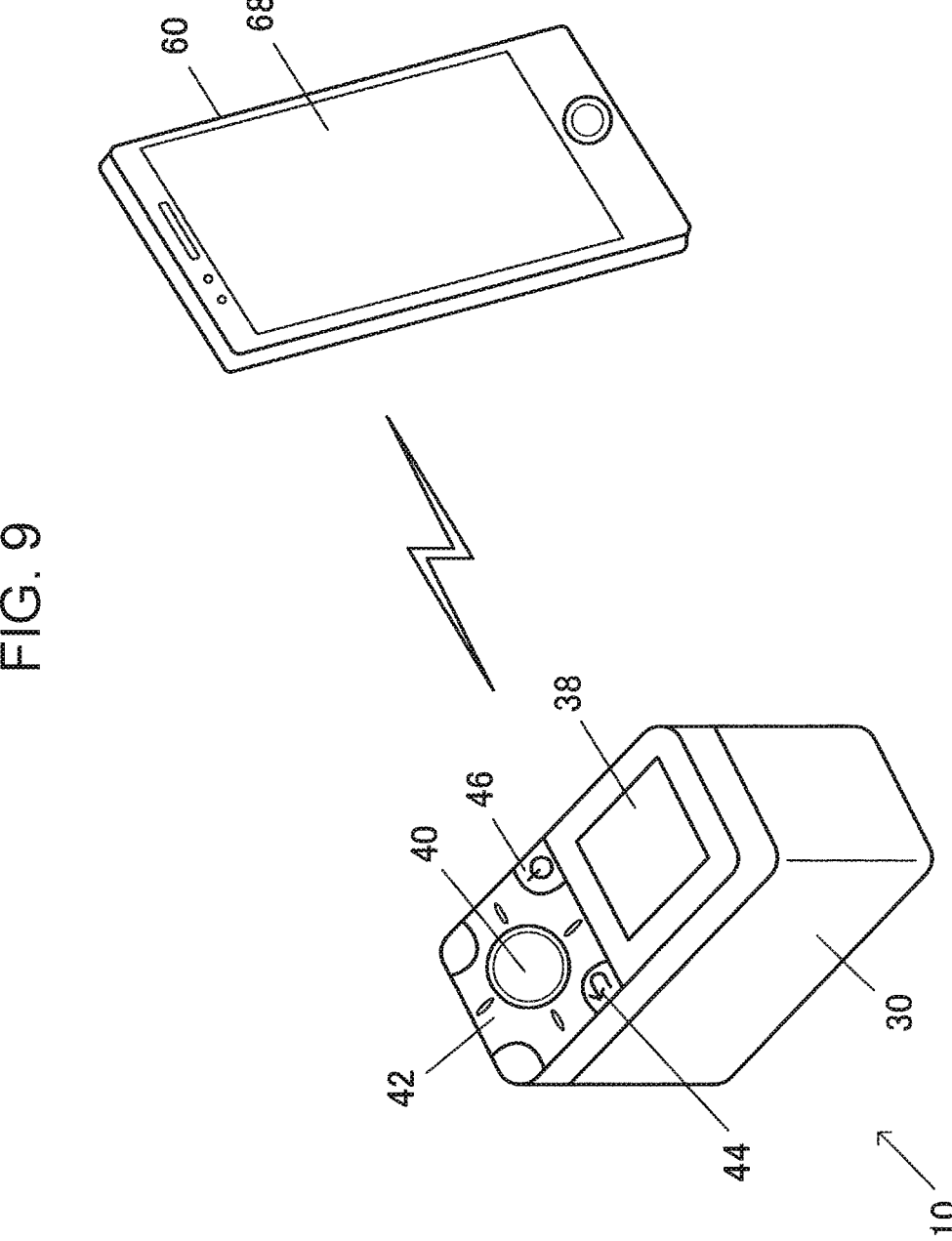
FIG. 9 is a diagram showing an appearance example of a colorimeter and a terminal device.
Figure 10:
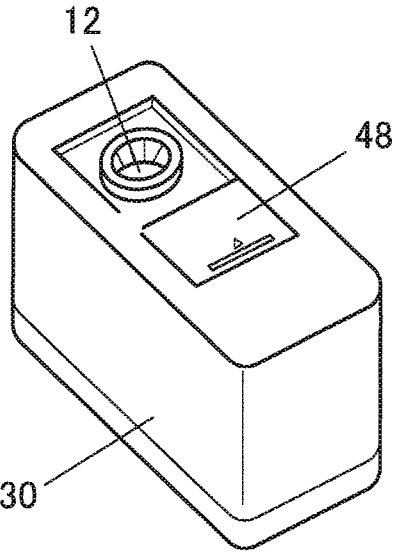
FIG. 10 is another diagram showing an appearance example of a colorimeter.

Further, for example, as shown in FIGS. 8, 9, and 10, the colorimetric system 10 of the present embodiment may include the terminal device 60 and the colorimeter 30. FIG. 8 is a block diagram showing a configuration example of the colorimeter 30 and the terminal device 60 constituting the colorimetric system 10 of the present embodiment, and FIG. 9 is a diagram showing an appearance example of the colorimeter 30 and the terminal device 60, and FIG. 10 is a diagram showing another appearance example of the colorimeter 30. It should be noted that FIGS. 8 to 10 are examples, and for example, the colorimetric system 10 of the present embodiment may be configured only by the colorimeter 30, but various modifications can be implemented. Further, the appearance of the colorimeter 30 is not limited to the example shown in FIGS. 9 and 10, and the appearance of the terminal device 60 is not limited to the example shown in FIG. 10.

The terminal device 60 is a communication terminal capable of communicating with the colorimeter 30, and the function thereof is implemented by, for example, a smartphone or a tablet-type personal computer (PC). The terminal device 60 communicates with the colorimeter 30 by wireless communication such as Bluetooth or Wi-Fi. The terminal device 60 includes the display unit 68, and is also provided with an operation device such as an operation button. Further, the display unit 68 is, for example, a touch panel, and the user performs various operations by touching the display unit 68, which is a touch panel.

The colorimeter 30 includes the colorimetric unit 12, the processing unit 32, an operation unit 34, a storage unit 36, the display unit 38, and the communication unit 39. The function of the colorimetric unit 12 is implemented by a colorimetry sensor or the like as described above.

The processing unit 32 performs control processes of respective units of the colorimeter 30 and respective processes of the present embodiment. For example, the processing unit 32 performs a process of controlling the colorimetric unit 12 and a process of acquiring colorimetry data from the colorimetric unit 12. Further, the processing unit 32 performs an input process of inputting user's operation information input by the operation unit 34, a reading process of reading information from the storage unit 36, and a writing process of writing information to the storage unit 36. Further, the processing unit 32 performs a display process of displaying information on the display unit 38, a control process of controlling communication by the communication unit 39, and the like. The function of the processing unit 32 can be implemented by a processor. For example, each process of the present embodiment can be implemented by a processor that operates based on information such as a program and a memory that stores information such as a program. The memory is the storage unit 36. For example, the function of each unit of the processor may be implemented by individual hardware, or the function of each unit may be implemented by integrated hardware. For example, the processor includes hardware, and the hardware can include at least one of a circuit that processes a digital signal and a circuit that processes an analog signal. For example, the processor may be configured by one or more circuit devices mounted on a circuit board, or one or more circuit elements. The processor may be, for example, a central processing unit (CPU). However, the processor is not limited to the CPU, but examples thereof may include various processors such as a graphics processing unit (GPU) and a digital signal processor (DSP). Further, the processor may be a hardware circuit by ASIC. Further, the processor may include an amplifier circuit, a filter circuit, and the like for processing an analog signal.

The operation unit 34 is an operation interface for inputting user operation information. The function of the operation unit 34 can be implemented by an operation device. As shown in FIG. 7 as an example, the function of the operation unit 34 can be implemented by operation devices such as a colorimetry button 40, a cross key 42, a back button 44, and a power button 46. However, the operation device that implements the function of the operation unit 34 is not limited to these operation devices.

The storage unit 36 stores various types of information. For example, the storage unit 36 stores programs and data. The storage unit 36 functions as, for example, a work region of the processing unit 32 and the communication unit 39. For example, the storage unit 36, which is a memory, may be a semiconductor memory such as a static random access memory (SRAM) or a dynamic random access memory (DRAM), may be a register, or may be a hard disk device or the like. For example, the storage unit 36, which is a memory, stores an instruction that can be read by a computer, and when the instruction is executed by the processing unit 32, which is a processor, the processing of each unit of the processing unit 32 is achieved. The instruction here may be an instruction set constituting the program, or may be an instruction instructing the hardware circuit of the processor to operate.

The display unit 38 displays various pieces of information to the user. The function of the display unit 38 can be implemented by various displays such as a liquid crystal display and an organic El display. The display unit 38 displays, for example, information necessary for the user to operate the colorimeter 30 and various pieces of status information of the colorimeter 30.

The communication unit 39 is a communication interface that performs wireless or wired communication with an external device. The function of the communication unit 39 can be implemented by, for example, hardware such as a communication ASIC or a communication processor, communication firmware, or the like. For example, the communication unit 39 communicates with an external device such as the terminal device 60 by short-range wireless communication such as Bluetooth. Specifically, the communication unit 39 communicates with an external device by wireless communication of the Bluetooth low energy (BLE) standard. Alternatively, the communication unit 39 may communicate with an external device by wireless communication of another standard such as Wi-Fi. Further, the communication unit 39 may perform wired communication according to a standard such as USB.

The terminal device 60 includes the processing unit 62, an operation unit 64, a storage unit 66, the display unit 68, and the communication unit 69.

The processing unit 62 performs a process of controlling each unit of the terminal device 60 and each process of the present embodiment. For example, further, the processing unit 62 performs an input process of inputting user's operation information input by the operation unit 64, a reading process of reading information from the storage unit 66, and a writing process of writing information to the storage unit 66. Further, the processing unit 62 performs a display process of displaying information on the display unit 68, a control process of controlling communication by the communication unit 69, and the like. The function of the processing unit 62 can be implemented by the above-mentioned processor or the like.

The operation unit 64 is an operation interface for inputting user operation information. The function of the operation unit 64 can be implemented by an operation device. As shown in FIG. 7 as an example, the function of the operation unit 64 can be implemented by an operation device such as a touch panel of the display unit 68 or an operation button provided on the terminal device 60. However, the operation device that implements the function of the operation unit 64 is not limited to such an operation device.

The storage unit 66 stores various types of information. For example, the storage unit 66 stores programs and data. The storage unit 66 functions as, for example, a work region of the processing unit 62 and the communication unit 69. For example, the storage unit 66, which is a memory, may be a semiconductor memory such as an SRAM or a DRAM, a register, a hard disk device, or an optical disk device. For example, the storage unit 66, which is a memory, stores an instruction that can be read by a computer, and when the instruction is executed by the processing unit 62, which is a processor, the processing of each unit of the processing unit 62 is achieved.

The display unit 68 displays various pieces of information to the user. The function of the display unit 68 can be implemented by various displays such as a liquid crystal display and an organic EL display. Further, the function of the display unit 68 is implemented by, for example, a touch panel, and also functions as the operation unit 64. The display unit 68 displays, for example, information necessary for the user to operate the terminal device 60, various pieces of status information of the terminal device 60 and the colorimeter 30, and the like.

The communication unit 69 is a communication interface that performs wireless or wired communication with an external device. The function of the communication unit 69 can be implemented by, for example, hardware such as a communication ASIC or a communication processor, communication firmware, or the like. For example, the communication unit 69 communicates with an external device such as the colorimeter 30 by short-range wireless communication such as Bluetooth. Specifically, the communication unit 69 communicates with an external device by wireless communication of the BLE standard. Alternatively, the communication unit 69 may communicate with an external device by wireless communication of another standard such as Wi-Fi. Further, the communication unit 69 may perform wired communication according to a standard such as USB.

Then, as described above, the processing of the colorimetric system 10 of the present embodiment may be implemented by, for example, the processing unit 62 of the terminal device 60. In this case, the processing unit 62 includes the processing unit 18, the display processing unit 20, and the comparison processing unit 19, and processes each of these units. Further, for example, the processing unit 62 may include the function of the reception unit 14 in FIG. 7. Further, as shown in FIG. 8, the processing unit 62 may include the terminal comparison processing unit 65 and the terminal display processing unit 67. In this case, the terminal comparison processing unit 65 corresponds to the comparison processing unit 19 in FIG. 1, and the terminal display processing unit 67 corresponds to the display processing unit 20 in FIG. 1. Further, for example, the program of the present embodiment is installed in the terminal device 60 as an application program and stored in the storage unit 66, and this application program executes each process of the processing unit 18, the display processing unit 20, and the comparison processing unit 19. Alternatively, the processing of the colorimetric system 10 may be implemented by the processing unit 32 of the colorimeter 30. In this case, the processing unit 32 includes the processing unit 18, the display processing unit 20, and the comparison processing unit 19, and processes each of these units. For example, the program stored in the storage unit 36 executes each process of the processing unit 18, the display processing unit 20, and the comparison processing unit 19. Further, the processing unit 62 may include the function of the reception unit 14 in FIG. 7. Further, the processing of the colorimetric system 10 may be implemented by the distributed processing of the processing unit 32 and the processing unit 62.

The colorimeter 30 shown in FIG. 9 has, for example, a substantially cubic shape, and is provided with the display unit 38, the colorimetry button 40, and the cross key 42 on the top face thereof. Further, the back button 44 and the power button 46 are also provided on the top face of the colorimeter 30. On the other hand, as shown in FIG. 10, the colorimetric unit 12 and a shutter 48 are provided on the top face of the colorimeter 30. The function of the display unit 38 is implemented by, for example, a liquid crystal display or an organic EL display, and displays various pieces of information to the user. The colorimetry button 40 is an operation device for instructing the user to cause the colorimeter 30 to perform colorimetry. For example, when the user presses the colorimetry button 40, the colorimeter 30 performs colorimetry using the colorimetric unit 12. The cross key 42 is an operation device for instructing, for example, up, down, left, and right directions. The back button 44 is a button for performing an operation for back, which is also referred to as a back operation, and the power button 46 is a button for turning on/off the power of the colorimeter 30. As described above, the function of the colorimetric unit 12 is implemented by the colorimetry sensor, and has, for example, a substantially circular shape in plan view. The shutter 48 protects the colorimetric unit 12 when the colorimeter 30 is not used. For example, when the colorimeter 30 is not used, the user moves the shutter 48 toward the colorimetric unit 12 to close the colorimetric unit 12 with the shutter 48 so that an external impact or the like is not applied to the colorimetric unit 12.

The colorimeter 30 shown in FIGS. 9 and 10 has a shape that allows the user to perform a colorimetry operation by grasping it with one hand. For example, the user grips the side face of the colorimeter 30 with his/her thumb, middle finger, ring finger, little finger, and the like, presses the colorimetry button 40 with his/her index finger, or indicates the direction with the cross key 42. However, the colorimeter 30 shown in FIGS. 7 and 8 is an example, and may be a colorimeter having another shape.

Figure 11:
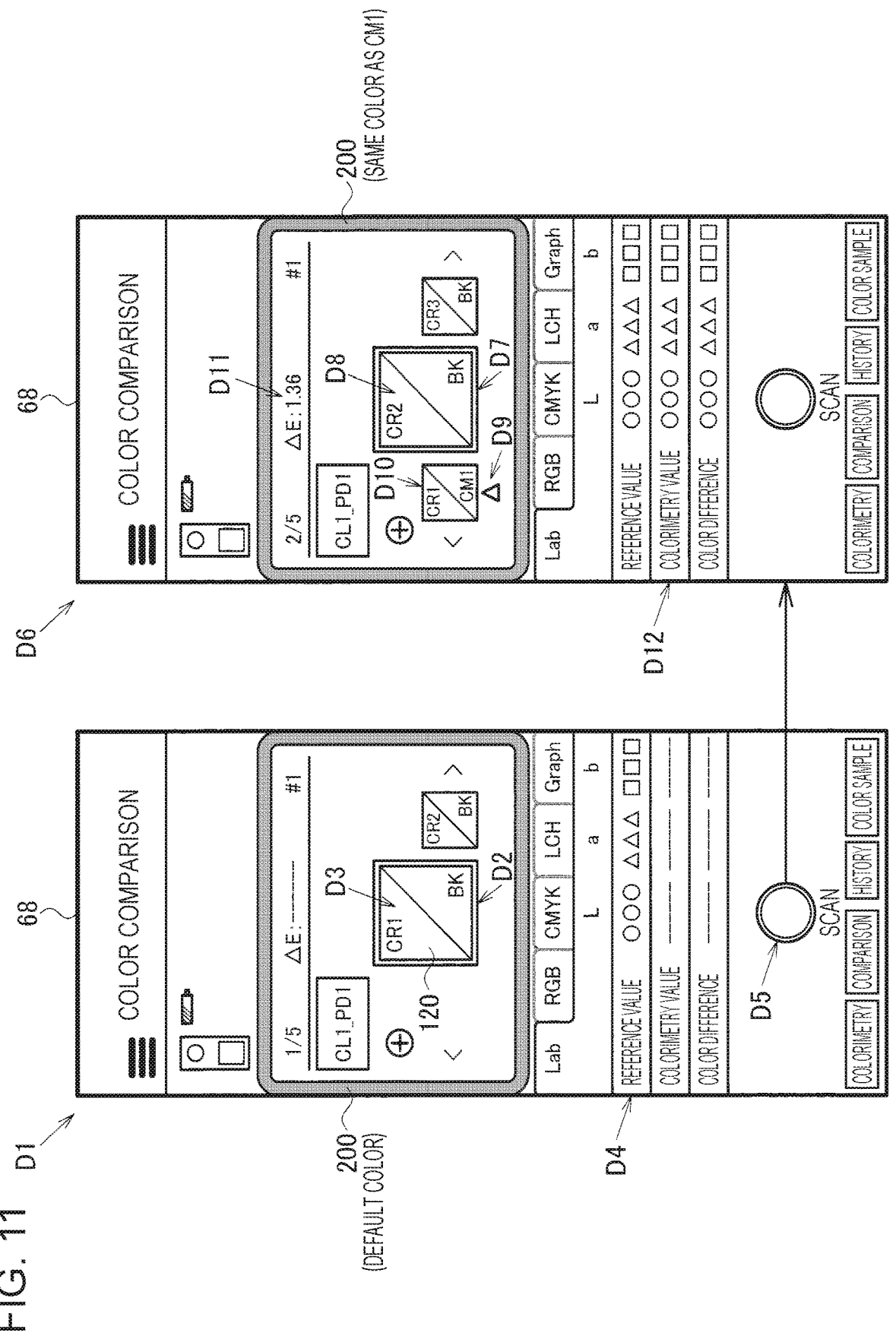
FIG. 11 is a diagram showing a screen example in a modification.
Figure 12:
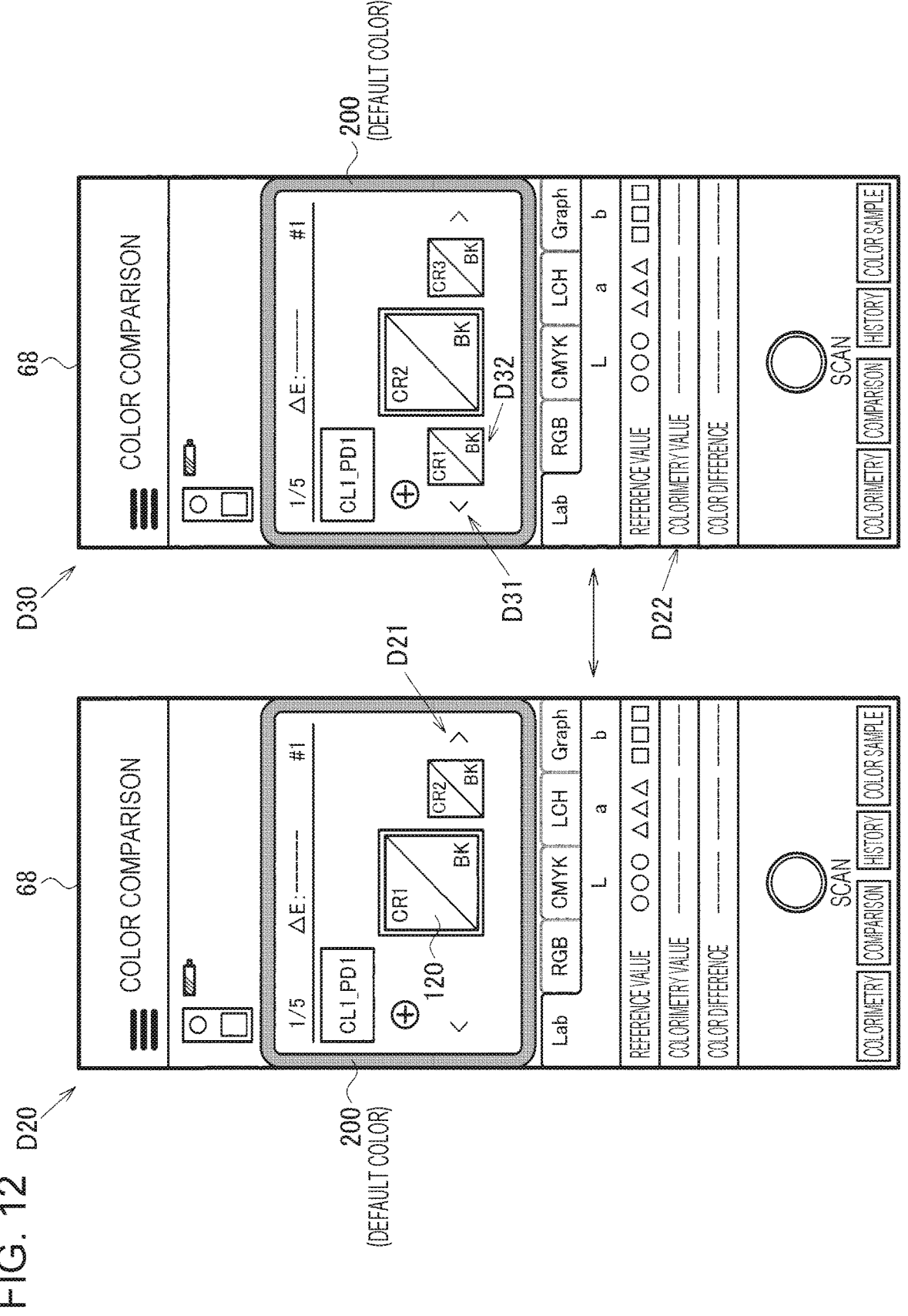
FIG. 12 is another diagram showing a screen example in a modification.

It should be noted that the screen example in the colorimetric system 10 of the present embodiment is not limited to examples shown in FIGS. 2 to 4 and 6, but various modifications can be implemented. For example, the spot colorimetry screen may have a screen as shown in FIGS. 11 and 12 a modification. In the following description of the modification, the reference colors included in the color group are referred to as a first color CR1, a second color CR2, a third color CR3, a fourth color CR4, and a fifth color CR5 in order from the head. That is, it is assumed that the first color CR1 is a color at the head in the color group and the fifth color CR5 is a color at the end in the color group. The same applies to the examples after FIG. 13.

In the modification, when the user starts the colorimetry program, a screen as indicated by D1 in FIG. 11 is displayed, for example. On the screen indicated by D1 in FIG. 11, as indicated by D2, a square-shaped first marker for identifying the color to be subjected to colorimetry next is displayed. Further, as indicated by D3, when dividing the square region surrounded by the first marker into two equal parts by one diagonal line, the icon of the first color CR1 as the first reference color in the color group is displayed in a reference color region 120, which is one of the two part. Of the square-shaped region surrounded by the first marker, the region different from the reference color region 120 is a blank BK. The blank BK is displayed in the same color as the background color, for example. That is, the user visually recognizes that the triangular icon filled with the first color CR1 is displayed inside the first marker on the screen of D1. Further, although the display of specific numerical values is omitted, as indicated by D4, the Lab value of the first color CR1, which is the color of the reference value for color comparison, is displayed. Further, a frame icon 200 is displayed so as to surround the reference color, the color that was subjected to colorimetry, and the like. On the screen indicated by D1, the color of the frame icon 200 displayed is the default color. The default color is, for example, the same color as the background color, but it may be an any color set by the user. Then, when the user operates the colorimetry button icon indicated by D5, a first colorimetry is performed, and the screen indicated by D6 is displayed as a result of the first colorimetry. The colorimetry operation may be performed by the colorimetry button 40 of the colorimeter 30.

On the screen of D6, a square-shaped first marker for identifying the color to be subjected to colorimetry next as indicated by D7, and the reference color region 120 filled with the second color CR2 as indicated by D8 are displayed. In this way, in the colorimetric system 10 of the modification, when the user performs spot colorimetry with the first color CR1 as a reference color, the preparation for performing spot colorimetry with the second color CR2 as a reference color is ready. Similarly, when the user performs spot colorimetry with the second color CR2 as a reference color, the preparation for performing spot colorimetry with the third color CR3 as a reference color is ready. The process of implementing this display will be described later. That is, in the colorimetric system 10 of this modification, the display order of the reference colors for spot colorimetry is determined as the initial setting. By doing so, the user can recognize that the color to be subjected to colorimetry next is the second color CR2 when the user performs spot colorimetry with the first color CR1 as a reference color.

Further, as indicated by D9, the second marker of the triangular arrow for identifying the color that was subjected to colorimetry this time is displayed. In other words, the second marker is a marker indicating the reference color related to the immediately preceding colorimetry and the color that was subjected to colorimetry immediately before. As indicated by D10, the square region is divided into two equal parts by a single diagonal line, and the first color CR1 and the color CM1 that was actually subjected to colorimetry are displayed so as to fill the respective two equal parts. In other words, the first color CR1 and the color CM1 that was actually subjected to colorimetry form the square icon. As described above, in the colorimetric system 10 of the present embodiment, the display processing unit 20 performs a display process of performing display so that forming a square, which is a predetermined figure, in the color that was subjected to colorimetry and the reference color indicates that colorimetry was performed. By doing so, the user can recognize that the reference color related to the color constituting the predetermined figure is the color that was subjected to colorimetry. The predetermined figure is not limited to a square, but may be, for example, a circle indicated by A51 in FIG. 4, an ellipse, a polygon, or a combination of a plurality of figures. Further, the color of the frame icon 200 is the same as the color that was subjected to colorimetry CM1. That is, the user can recognize the color that was subjected to colorimetry immediately before by looking at the frame icon 200.

Further, as indicated by D11, the color difference ΔE between the color CM1 that was subjected to colorimetry and the first color CR1 which is the reference color is also displayed. Further, as indicated by D12, the Lab value of the color CM1 that was subjected to colorimetry is displayed as a colorimetry value, and the Lab value of the first color CR1 which is the reference color is displayed as a reference value. Further, the difference between the colorimetry value and the reference value is calculated and displayed for each Lab value component. A region filled in a triangular shape with the third color CR3 is displayed right of the first marker indicated by D7. That is, as described above, in the colorimetric system 10 of the modification, the display order of the reference colors for spot colorimetry is determined as the initial setting, and the third color CR3 is determined as the reference color in the order following the second color CR2. Further, the frame icon 200 is displayed in the same color as the color CM1 that was actually subjected to colorimetry.

Further, in the colorimetric system 10 of the present embodiment, a color displayed in the reference color region 120 as the reference color for spot colorimetry can be changed. For example, on the screen indicated by D20 in FIG. 12, when the user selects the right-pointing arrow-shaped icon indicated by D21, the screen transitions to a screen indicated by D30, and the reference color region 120 surrounded by the first marker on the screen indicated by D30 is displayed so as to be filled with the second color CR2. Further, by the above-mentioned initial setting, an icon in which a region is filled with the first color CR1 in a triangular shape is displayed left of the first marker, and an icon in which a region is filled with the third color CR3 in a triangular shape is displayed right of the first marker. Further, when the user selects the left-pointing arrow-shaped icon indicated by D31 on the screen indicated by D30, the screen returns to a screen of D20 described above. Comparing FIGS. 11 with 12, the screen indicated by D1 in FIG. 11 and the screen indicated by D20 in FIG. 12 are the same, but the screen indicated by D6 in FIG. 11 and the screen indicated by D30 in FIG. 12 are different. Specifically, as indicated by D32, the screen example indicated by D30 in FIG. 12 does not perform colorimetry, so that a square icon is formed by the first color CR1 and the color CM1 that was actually subjected to colorimetry, and the second marker is not displayed. Further, while the color of the frame icon 200 on the screen of D6 in FIG. 11 is the same as the color of the color CM1, the color of the frame icon 200 on the screen of D30 in FIG. 12 is the same as the default color. Although specific numbers are not displayed, when the user selects the right-pointing arrow-shaped icon indicated by D11 or the left-pointing arrow-shaped icon indicated by D21, the reference value of the reference color is also changed. That is, while the reference value indicated by D12 is the Lab value of the first color CR1, the reference value indicated by D22 is the Lab value of the second color CR2. As described above, in the colorimetric system 10 of the present embodiment, the reception unit 14 receives an operation of skipping the order of colorimetry as a predetermined operation. By doing so, the user can freely set the reference color for spot colorimetry even when the order of display of the reference color for spot colorimetry is determined. This makes it possible to improve the convenience of the colorimetric system 10.

Next, a processing example of the modification will be described with reference to FIGS. 13, 14, 15, 16, 17, 18, and 19. The comparison processing unit 19 transmits the transmission command determined by the transmission command determination process (step S100) in FIG. 13 to the display processing unit 20, and the display processing unit 20 performs a display process of displaying the screen determined by the color comparison screen process in FIG. 17 (step S500) on the display unit 68 based on the received transmission command. The transmission command here is a group of commands including a colorimetry result command, a colorimetry target command, a confirmation display command, and the like, which will be described later. Further, the colorimetry result command is specifically a first colorimetry result command or a second colorimetry result command, which will be described later, and may be collectively referred to simply as a colorimetry result command. Further, the confirmation display command is specifically a first confirmation display command or a second confirmation display command, which will be described later, and may be collectively referred to simply as a confirmation display command. Further, specific screen examples to which the processing examples in FIGS. 13 to 19 are applied will be described later in FIG. 20 and the subsequent figures.

Figure 13:
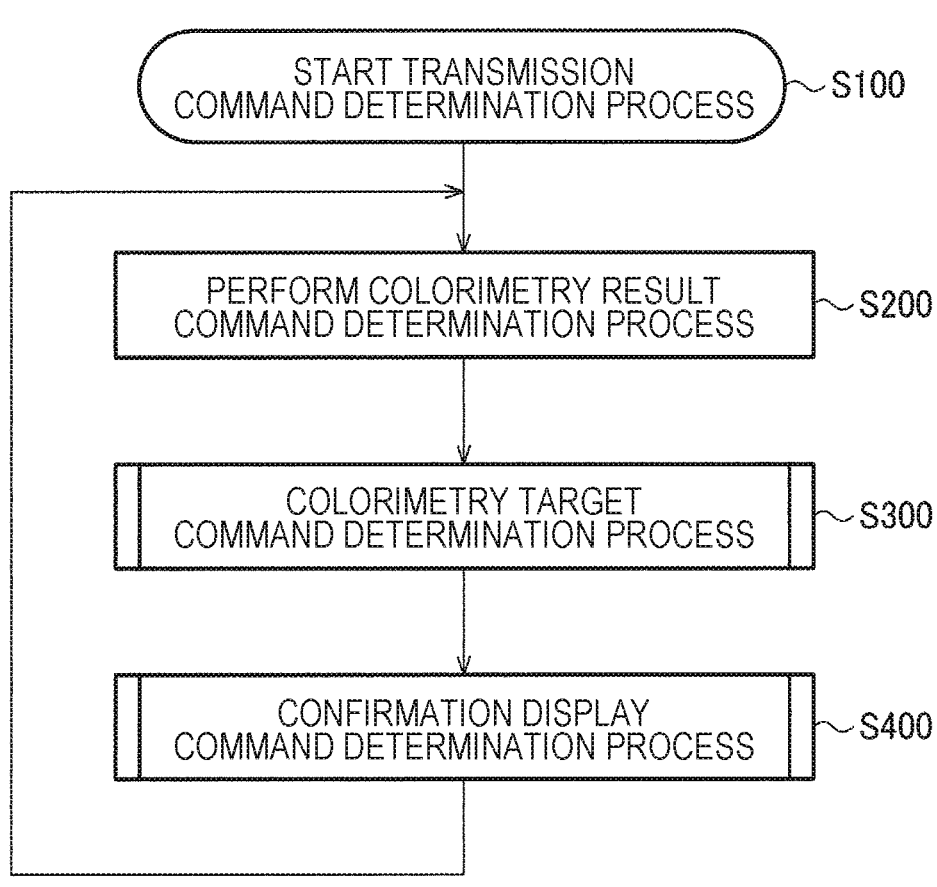
FIG. 13 is a flowchart showing a processing example of a command determination process.

FIG. 13 is a flowchart showing a processing example of the transmission command determination process (step S100). After the user starts the spot colorimetry application program, as the transmission command determination process (step S100), the colorimetry result command determination process (step S200), the colorimetry target command determination process (step S300), and the confirmation display command determination process (step S400) are repeated. Then, the comparison processing unit 19 transmits the transmission command determined in each process to the display processing unit 20.

Although the detailed illustration of the process is omitted, the colorimetry result command determination process (step S200) is a process in which at the timing when the colorimetric unit 12 transmits the color value to the comparison processing unit 19, the comparison processing unit 19 issues a command for displaying the color value and the like, and the color difference ΔE and the like on the display unit 68. The colors and the like that are the reference colors to be displayed in the reference color region 120 described above in FIG. 11 and the like are based on the colorimetry target command described later.

Figure 14:
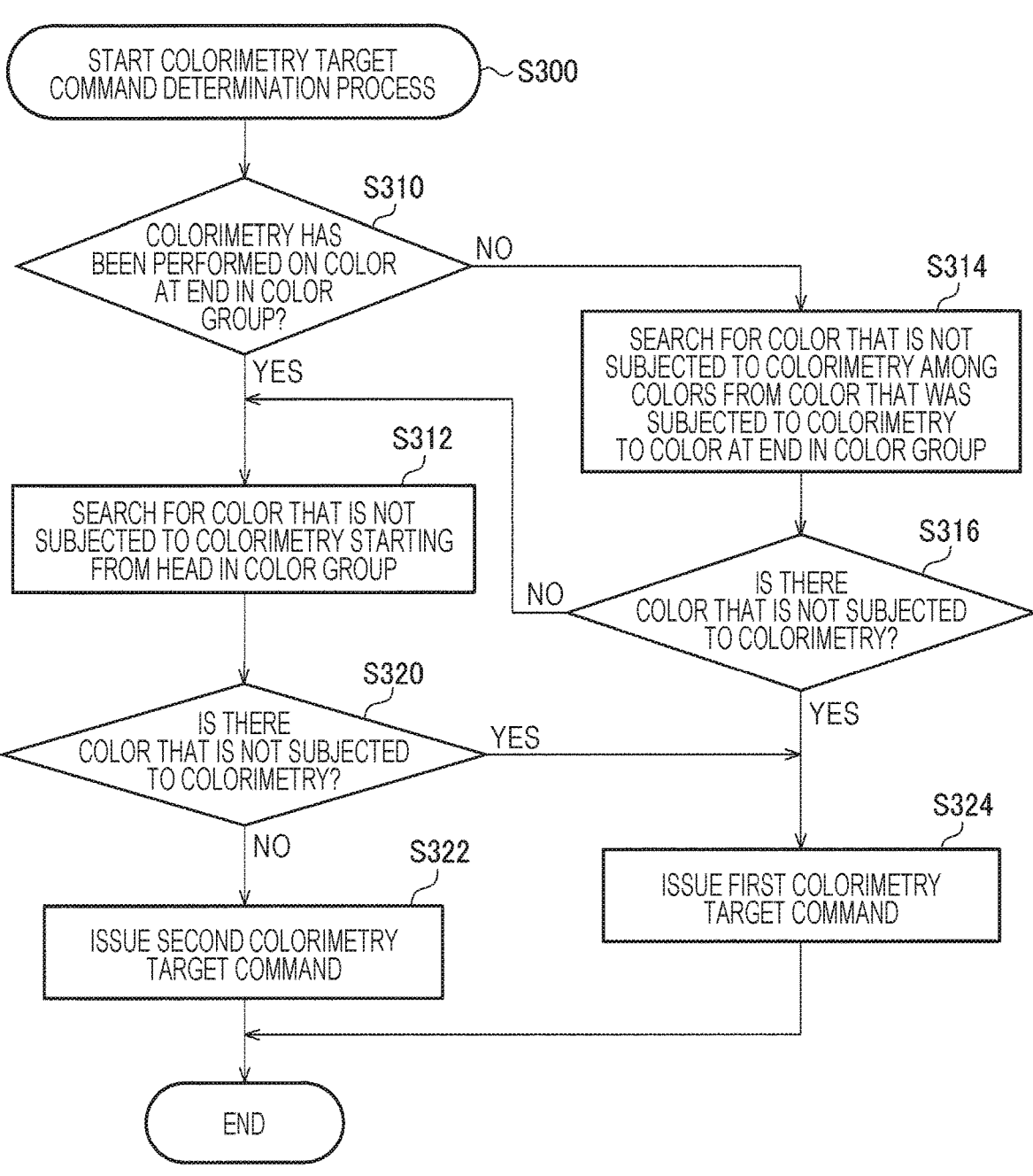
FIG. 14 is a flowchart showing a processing example of a colorimetry target command determination process.

FIG. 14 is a flowchart showing a processing example of the colorimetry target command determination process (step S300). The comparison processing unit 19 performs a process (step S310) of determining whether colorimetry of a color at the end in the color group was performed. When colorimetry of a color other than the color at the end in the color group was performed (NO in step S310), the comparison processing unit 19 performs a process (step S314) of searching colors from the color that was subjected to colorimetry to the color at the head in the color group. For example, as in step S40 described in FIG. 5, step S310 and step S314 are processes that can be achieved by using the colorimetry completion flag, and the same applies to step S312, step S320, and step S420 in FIG. 16 to be described later.

Specifically, for example, as described above in FIG. 11, when the user starts the spot colorimetry application program and first performs colorimetry with the first color CR1, which is the color at the head in the color group, as a reference color, the second color CR2, which is the color next to the first color CR1, is determined to be a color that is not subjected to colorimetry in step S314. In this way, the comparison processing unit 19 determines, as the color to be subjected to colorimetry next, the color that is not subjected to colorimetry among colors from the color next to the color that was subjected to colorimetry in the color group to the color at the end in the color group. By doing so, it is possible to search for a color that is not subjected to colorimetry in order from the color at the head in the color group.

Further, after performing step S314, the comparison processing unit 19 performs a process of determining whether there is a color that is not subjected to colorimetry (step S316), and when there is not a color that is not subjected to colorimetry (NO in step S316), step S312 described later is performed. On the other hand, when there is a color that is not subjected to colorimetry (YES in step S316), the comparison processing unit 19 performs step S324 described later.

Further, when colorimetry of the color at the end in the color group was performed (YES in step S310), the comparison processing unit 19 performs a process (step S312) of searching for a color that is not subjected to colorimetry starting from the color at the head in the color group. Then, the comparison processing unit 19 performs a process (step S320) of determining whether there is a color that is not subjected to colorimetry. When the comparison processing unit 19 determines that there is a color that is not subjected to colorimetry (YES in step S320), the comparison processing unit 19 performs a process of issuing a first colorimetry target command (step S324). On the other hand, when it is determined that there is not a color that is not subjected to colorimetry (NO in step S320), the comparison processing unit 19 performs a process of issuing a second colorimetry target command (step S322).

The first colorimetry target command in step S324 is a command instructing the display processing unit 20 to perform control to display the color that is not subjected to colorimetry in the reference color region 120, for example, as shown in FIG. 15. On the other hand, the second colorimetry target command in step S322 is a command instructing the display processing unit 20 to display the end icon in the center of the screen, for example, as shown in FIG. 15. Specifically, for example, in the above-mentioned example in FIG. 11, the comparison processing unit 19 searches for the color CS2 as a color that is not subjected to colorimetry in step S314, issues the first colorimetry target command of displaying the second color CR2 in the reference color region 120 in step S324, and transmits the first colorimetry target command to the display processing unit 20. As a result, as shown in the screen of D6 in FIG. 11, the second color CR2 can be displayed in the reference color region 120.

Figure 16:
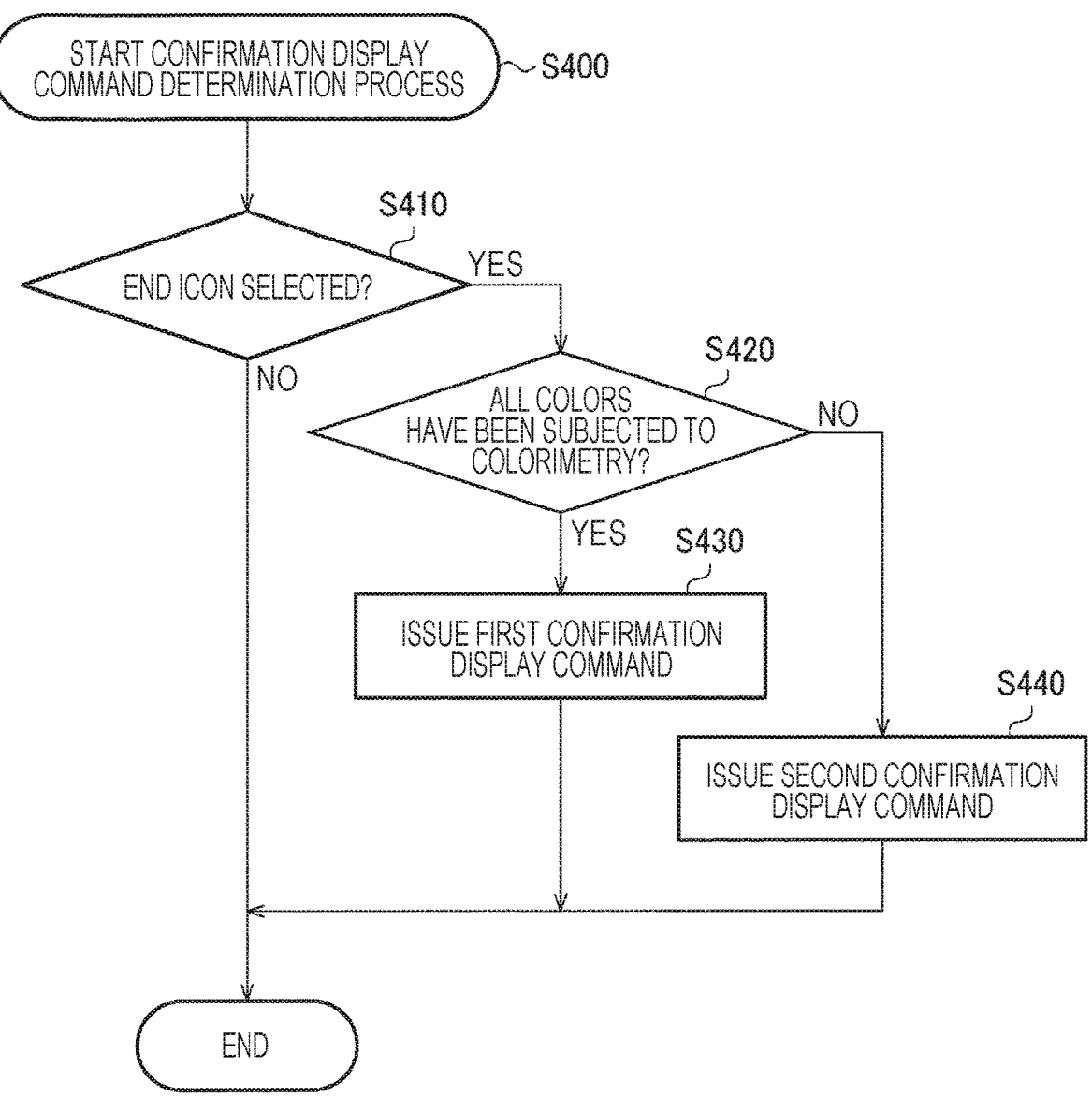
FIG. 16 is a flowchart showing a processing example of a confirmation display command determination process.

FIG. 16 is a flowchart showing a processing example of the confirmation display command determination process (step S400). The comparison processing unit 19 performs a process (step S410) of determining whether the end icon was selected. When the end icon is not selected (NO in step S410), the flow is terminated, and when the end icon is selected (YES in step S410), the comparison processing unit 19 performs a process of determines whether all the colors have been subjected to colorimetry (step S420). When it is determined that all the colors have been subjected to colorimetry (YES in step S420), the comparison processing unit 19 performs a process of issuing a first confirmation display command (step S430), and when it is determined that all the colors have not been subjected to colorimetry (NO in step S420), the comparison processing unit 19 performs a process of issuing a second confirmation display command (step S440), and the flow is terminated. The first confirmation display command is a command for displaying a first confirmation screen 310 described later in FIG. 25, and the second confirmation display command is a command for displaying a second confirmation screen 320 described later in FIG. 26.

Figure 17:
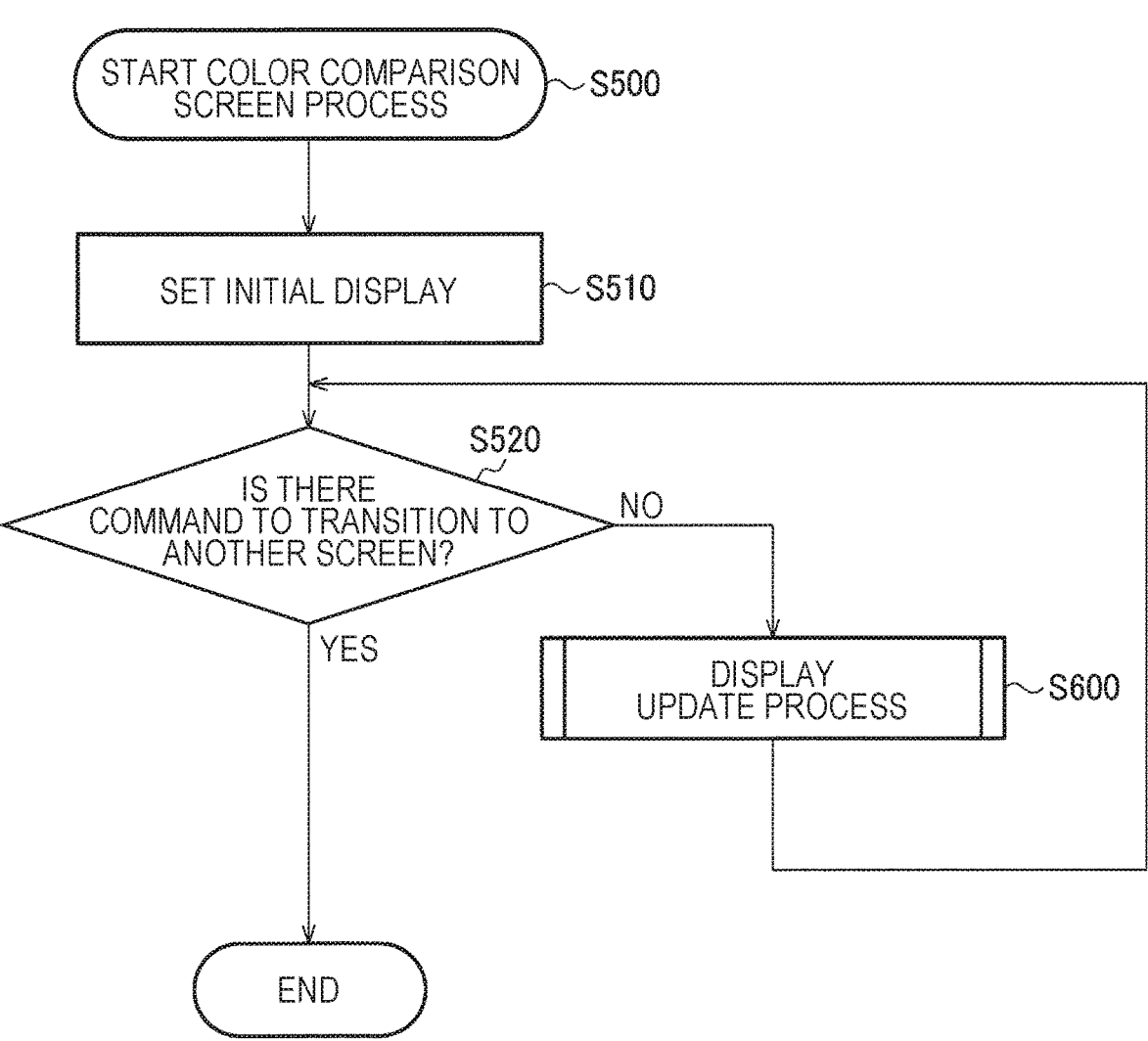
FIG. 17 is a flowchart showing a processing example of a color comparison screen process.

FIG. 17 is a flowchart showing a processing example of the color comparison screen process (step S500). When the spot colorimetry application program is started, the display processing unit 20 first performs the initial display setting (step S510). As a result, the display processing unit 20 specifically displays, for example, the screen indicated by D1 in FIG. 11 on the display unit 68. After that, the display processing unit 20 performs a process (step S520) of determining whether a command for transitioning to another screen is received, and when receiving a command for transitioning to another screen (YES in step S520), the display processing unit 20 performs the process of displaying the screen based on the content of the command, and the spot colorimetry application program is terminated. The another screen is, for example, a screen based on a line colorimetry application program, a home screen, or the like. On the other hand, when there is no command for transitioning to another screen (NO in step S520), the display processing unit 20 performs the display update process (step S600) and repeats step S520. That is, after the user starts the spot colorimetry application program, the display based on the command received from the comparison processing unit 19 is continued to be updated by the display update process (step S600) unless there is a command for transitioning to another screen.

Figure 18:
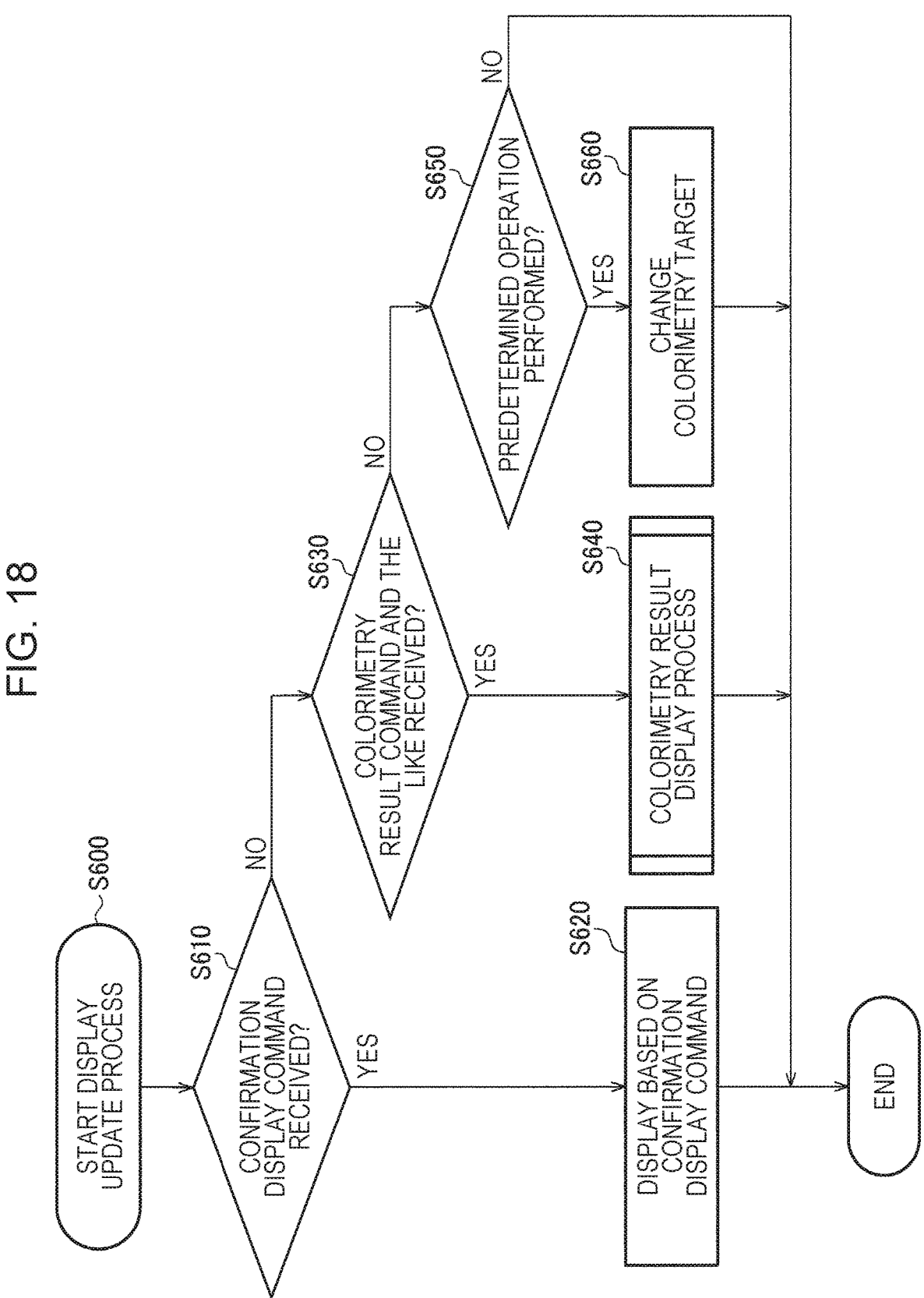
FIG. 18 is a flowchart showing a processing example of a display update process.

FIG. 18 is a flowchart showing a processing example of the display update process (step S600). The display processing unit 20 performs a process (step S610) of determining whether the confirmation display command by the confirmation display command determination process (step S400) described above in FIG. 16 was received. When the display processing unit 20 receives the confirmation display command (YES in step S610), the display processing unit 20 performs display based on the confirmation display command (step S620) and ends the flow.

Further, when the confirmation display command is not received (YES in step S610), the display processing unit 20 performs a process (step S630) of determining whether a colorimetry result command and the like was received. When the display processing unit 20 determines that the colorimetry result command and the like have been received (YES in step S630), the display processing unit 20 performs the colorimetry result display process (step S640) described later in FIG. 19 and ends the flow. The colorimetry result command and the like are a colorimetry result command and a colorimetry target command.

When it is determined that the colorimetry result command and the like is not received (NO in step S630), the display processing unit 20 performs a process (step S650) of determining whether the predetermined operation described above in FIG. 12 was performed. When it is determined that the predetermined operation was performed (YES in step S650), the display processing unit 20 performs a process of changing the colorimetry target (step S660) and ends the flow. On the other hand, when it is determined that the predetermined operation is not performed (NO in step S650), the display processing unit 20 ends the flow. By the process of changing the colorimetry target (step S660), for example, the reference color displayed in the reference color region 120 described above in FIG. 12 is changed, and in conjunction with this, the reference color and the like displayed left and right of the first marker will be changed.

Figure 19:
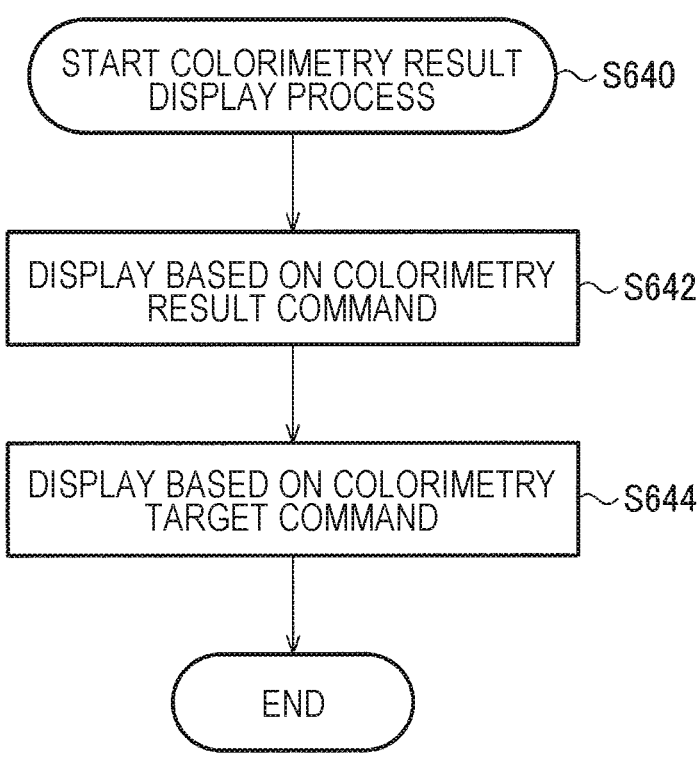
FIG. 19 is a flowchart showing a processing example of a colorimetry result display process.

FIG. 19 is a flowchart showing a processing example of the colorimetry result display process (step S640). The display processing unit 20 perform display based on the colorimetry result command (step S642). Specifically, for example, in the screen example of D6 in FIG. 11 described above, the display processing unit 20 performs a display process of displaying the colorimetry value indicated by D12, a display process of making the color of the frame icon 200 a color same as the color CM1, which is the color that was subjected to colorimetry, and the like. After that, the display processing unit 20 performs display based on the colorimetry target command (step S644). Specifically, for example, a display process of displaying the color to be subjected to colorimetry is performed in the region surrounded by the first marker described above.

Figure 20:
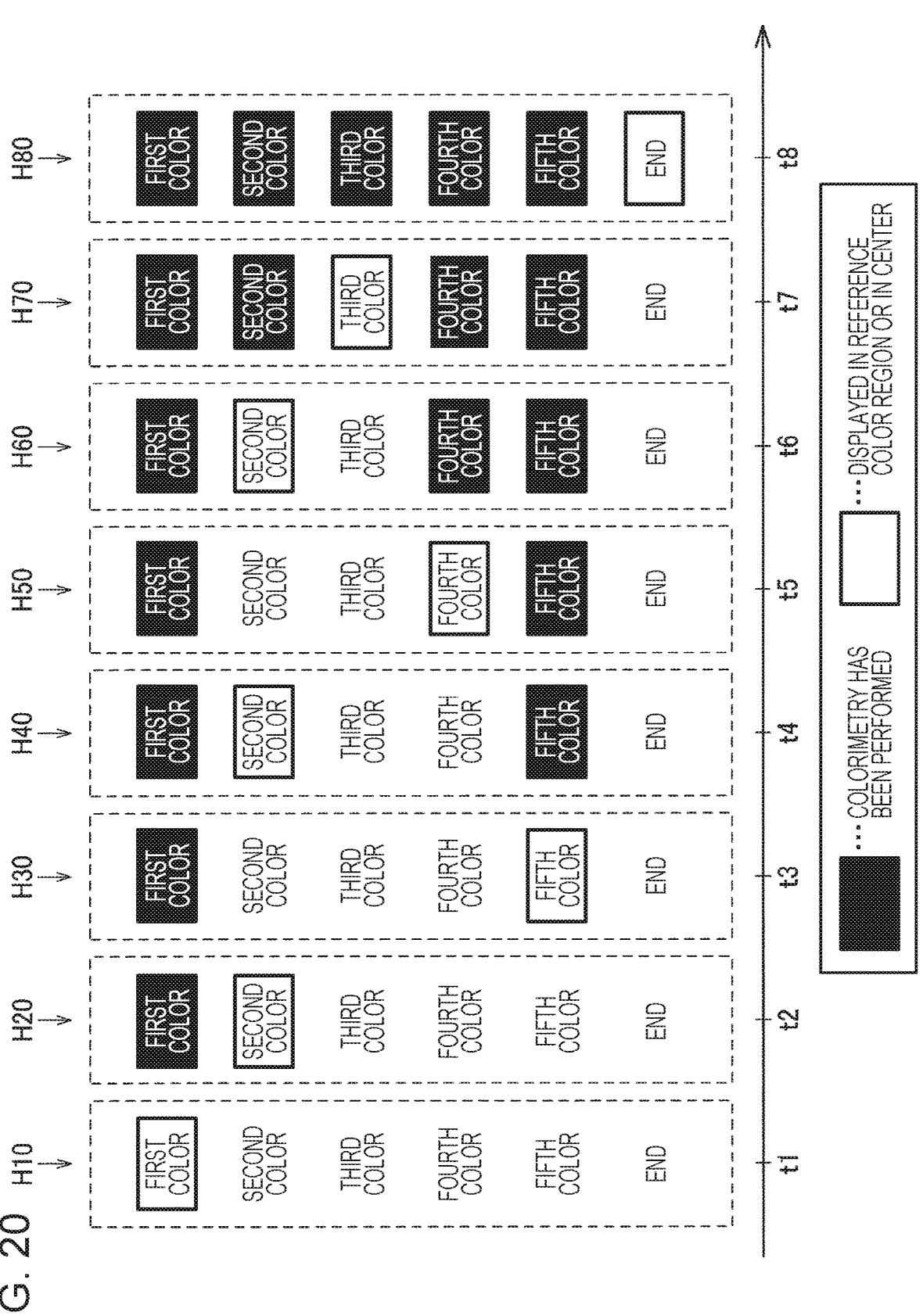
FIG. 20 is a diagram showing an example of spot colorimetry to which the technique of a modification is applied.
Figure 21:
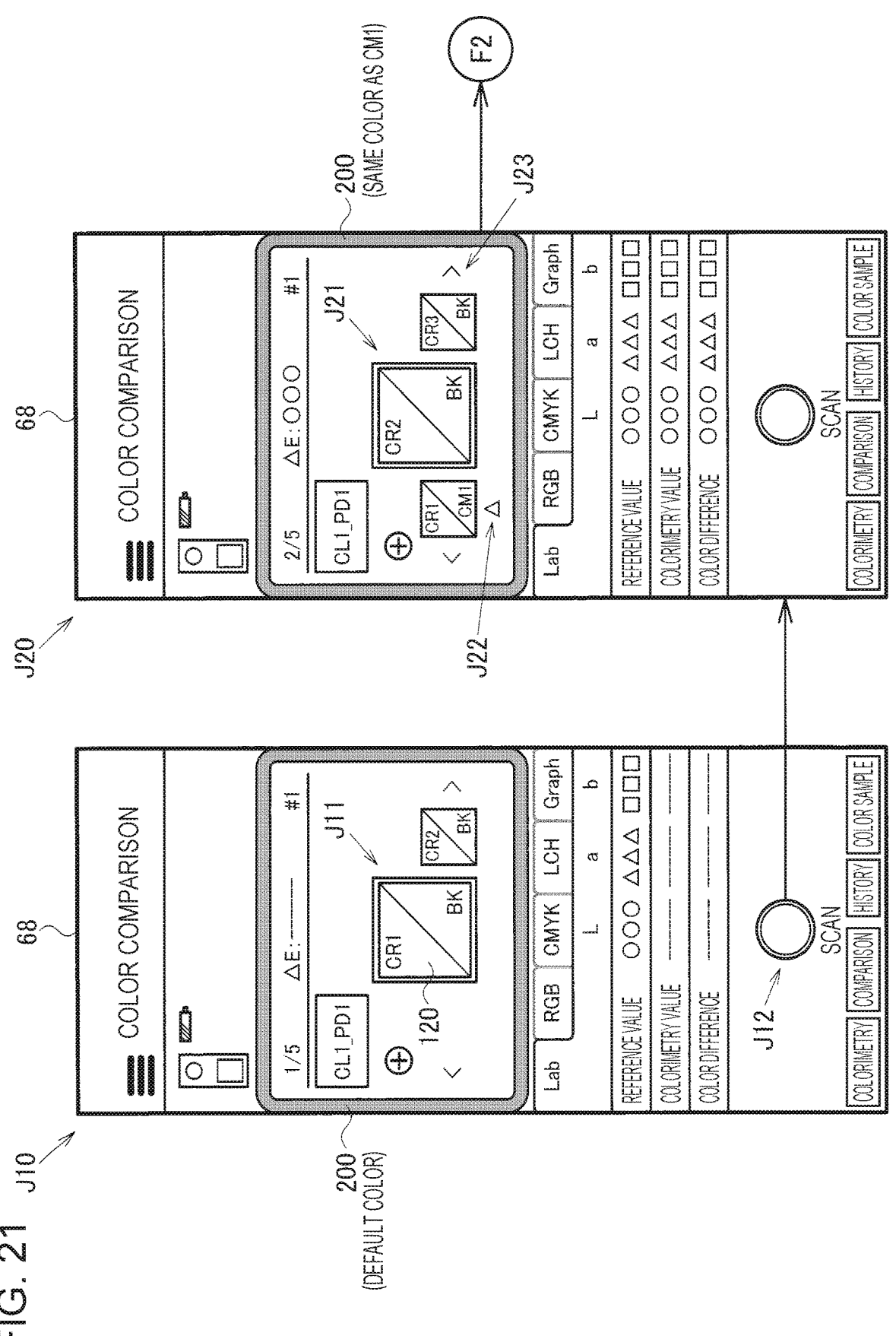
FIG. 21 is a diagram showing a screen example to which the technique of a modification is applied.

Next, an example of spot colorimetry to which the above-mentioned processing examples in FIGS. 13 to 19 are applied will be described with reference to FIGS. 20, 21, 22, 23, and 24. The colorimetric system 10 stores the first color CR1, the second color CR2, the third color CR3, the fourth color CR4, and the fifth color CR5 as reference colors, and colors corresponding to the first color CR1, the second color CR2, the third color CR3, the fourth color CR4, and the fifth color CR5 are printed on the printed matter on which the user performs colorimetry. In this case, the first color CR1, the second color CR2, the third color CR3, the fourth color CR4, and the fifth color CR5 may be displayed in the reference color region 120 of the display unit 68. Further, the end icon may be displayed in the center of the display unit 68. FIG. 20 shows the relationship between a color related to spot colorimetry and a color that can be displayed in the reference color region 120 or an end icon that can be displayed in the center during a period from when the spot colorimetry application program is started to when the spot colorimetry is completed. Although the horizontal axis in FIG. 20 is a time axis, the length of the axis does not specifically indicate the time required for colorimetry or the like. Further, when the description and the illustration already described in FIGS. 11 and 12 and the like overlap with those in FIG. 21 and subsequent figures, the description and the illustration may be omitted as appropriate.

As indicated by H10 in FIG. 20, the first color CR1 is displayed in the reference color region 120 at the timing t1 when the user starts the spot colorimetry application program. Specifically, the first color CR1 is displayed as shown in the screen indicated by J10 in FIG. 21.

Then, it is assumed that the user performs spot colorimetry with the first color CR1 as a reference color, and the spot colorimetry is completed at the timing t2. In this case, since the first color CR1 is not a color at the end in the color group, the comparison processing unit 19 makes determination of NO in step S310 in FIG. 14, and searches for a color that is not subjected to colorimetry among colors from the first color CR1 to the fifth color CR5 that is a color at the end in the color group in step S314. As a result, as indicated by H20 in FIG. 20, the comparison processing unit 19 determines that the second color CR2 is a color that is not subjected to colorimetry. As a result, the comparison processing unit 19 makes determination of YES in step S316, and issues the first colorimetry target command in step S324. As a result, the display processing unit 20 displays the screen indicated by J20 in FIG. 21. For example, the display processing unit 20 displays the frame icon 200 in the same color as the color CM1 that was subjected to colorimetry with the first color CR1 as a reference color in step S642 in FIG. 19. Further, the display processing unit 20 displays the second color CR2 in the reference color region 120 based on the first colorimetry result command in step S644 in FIG. 19. Further, as indicated by J22, the second marker under the square region of the first color CR1 which is the reference color related to the immediately preceding colorimetry and the color CM1 that was actually subjected to colorimetry is displayed left of the first marker.

Here, as indicated by H30 in FIG. 20, it is assumed that the user performs a predetermined operation at the timing t3 and changes the reference color from the second color CR2 to the fifth color CR5. Specifically, on the screen of J20 in FIG. 21, the user performs the operation of selecting the icon of the right-pointing arrow indicated by J23 three times as a predetermined operation. As a result, the display processing unit 20 displays the fifth color CR5 in the reference color region 120 in step S660 in FIG. 18. Specifically, the fifth color CR5 is displayed as shown in the screen indicated by J30 in FIG. 22. In the screen indicated by J30, the fourth color CR4 displayed left of the screen is a reference color for which colorimetry is not performed, so that the user recognizes that a triangle of the fourth color CR4 is displayed left of the first marker. Further, since the fifth color CR5 is a color at the end in the group, a color that is a reference color is not displayed right of the first marker, and the reduced end icon is displayed.

Then, it is assumed that as indicated by H40 in FIG. 20, the user performs spot colorimetry with the fifth color CR5 as a reference color, and the spot colorimetry is completed at the timing t4. In this case, since the fifth color CR5 is a color at the end in the color group, the comparison processing unit 19 makes determination of YES in step S310 in FIG. 14, and searches for a color that is not subjected to colorimetry starting from the first color CR1 which is the color at the head in the color group in step S312. Then, the comparison processing unit 19 determines that the second color CR2, which is the color next to the first color CR1, is a color that is not subjected to colorimetry, makes determination of YES in step S320, and issues the first colorimetry target command in step S324. As described above, when there are colors that are not subjected to colorimetry, the comparison processing unit 19 determines the second color CR2 that is a color at the head in the color group as the color to be subjected to colorimetry next among the second color CR2, the third color CR3, and the fourth color CR4 that are colors that are not subjected to colorimetry. By doing so, when there is a plurality of colors that is not subjected to colorimetry, it is possible to determine which color is to be the color to be subjected to colorimetry next.

Figure 22:
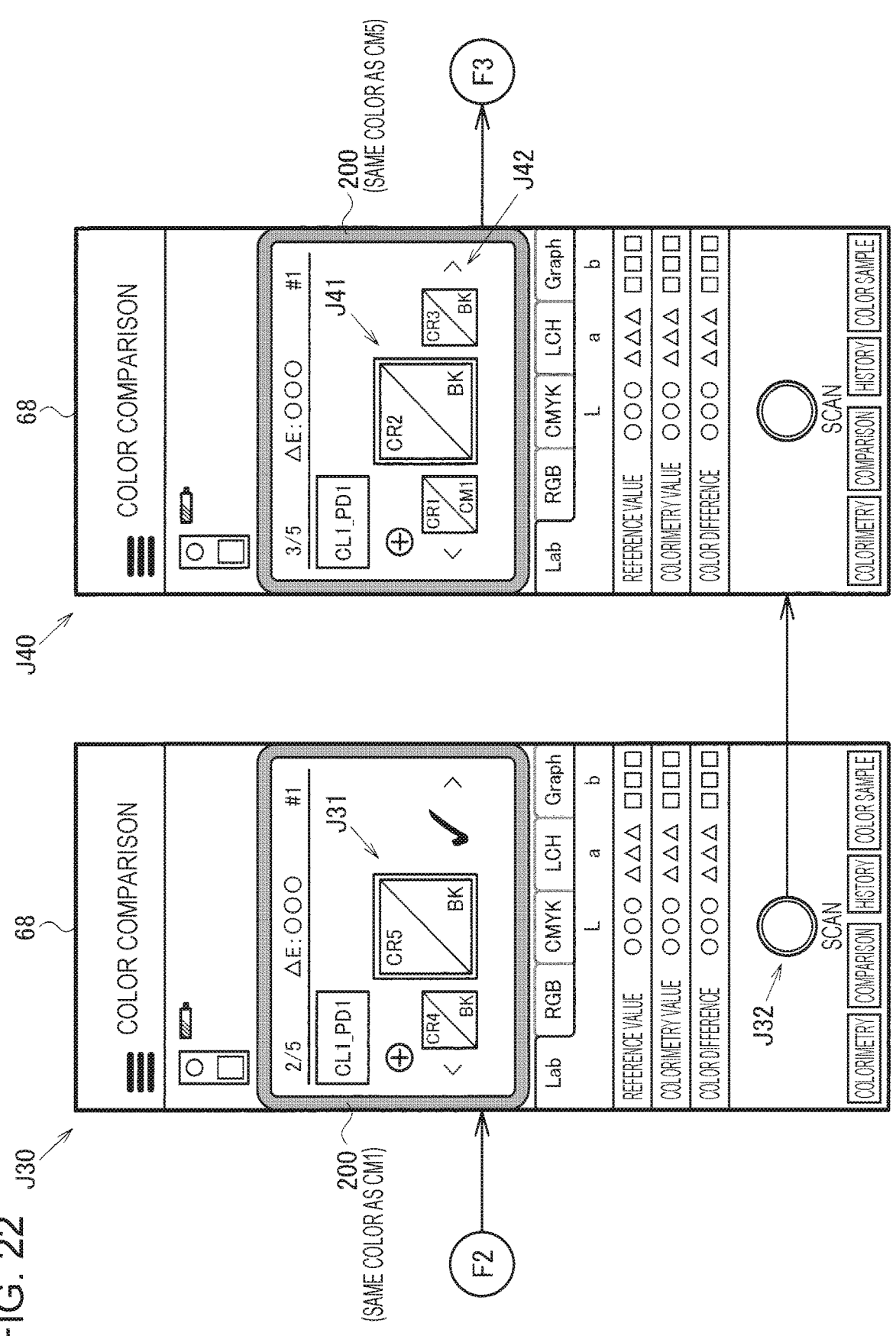
FIG. 22 is another diagram showing a screen example to which the technique of a modification is applied.

Then, the display processing unit 20 displays the screen indicated by J40 in FIG. 22. For example, the display processing unit 20 displays the frame icon 200 in the same color as the color CM5 that was subjected to colorimetry with the fifth color CR5 as a reference color in step S642 in FIG. 19. Further, the display processing unit 20 displays the second color CR2 in the reference color region 120 based on the first colorimetry result command as indicated by J41 in FIG. 22 in step S644 in FIG. 19. In the screen indicated by J40, the first color CR1 displayed left of the first marker is the reference color for which colorimetry was performed, but it is not the reference color related to the immediately preceding colorimetry, so that the second marker is not displayed under the square region of the first color CR1 and the color CM1 that was actually subjected to colorimetry. In this way, when the color at the end in the color group was subjected to colorimetry (YES in step S310), in a case in which the comparison processing unit 19 determines that the color group includes a color that is not subjected to colorimetry (YES in step S320), the display processing unit 20 performs a display process (step S324, step S644) of displaying the color that is not subjected to colorimetry as a color to be subjected to colorimetry next. By doing so, the user can recognize the existence of the color that is not subjected to colorimetry before attempting to finish the spot colorimetry.

Figure 23:
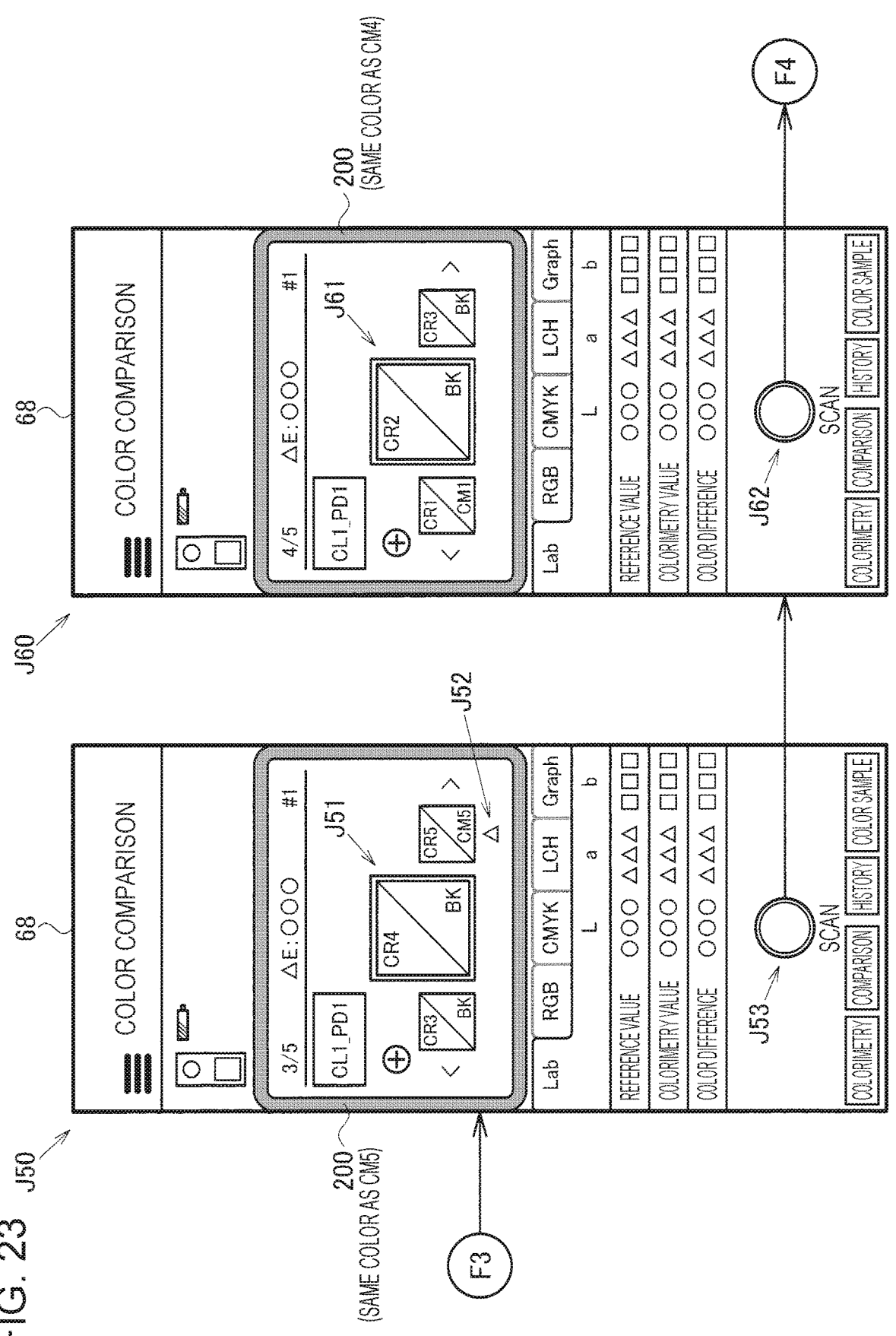
FIG. 23 is another diagram showing a screen example to which the technique of a modification is applied.

Here, it is assumed that the user performs a predetermined operation at the timing t5 and changes the reference color from the second color CR2 to the fourth color CR4 as indicated by H50 in FIG. 20. Specifically, for example, on the screen of J40 in FIG. 22, the user performs the operation of selecting the icon of the right-pointing arrow indicated by J42 twice as a predetermined operation. As a result, the display processing unit 20 displays the fourth color CR4 in the reference color region 120 in step S660 in FIG. 18. Specifically, for example, a screen as indicated by J50 in FIG. 23 is displayed. For example, the display processing unit 20 displays the fourth color CR4 in the reference color region 120 as indicated by J51 in FIG. 23. When the fourth color CR4 is displayed in the reference color region 120, the fifth color CR5 is the reference color related to the immediately preceding colorimetry. Therefore, as indicated by J52 in FIG. 23, the second marker is displayed under the square figure of the fifth color CR5 and the color CM5 that was subjected to colorimetry with the fifth color CR5 as a reference colors right of the first marker. In the screen indicated by J50, the third color CR3, which is the reference color displayed left of the first marker, is a reference color for which colorimetry is not performed, so that the user recognizes that a triangle of the third color CR3 is displayed left of the screen indicated by J50.

Then, it is assumed that the user selects the colorimetry button icon of J53 in FIG. 23, performs spot colorimetry with the fourth color CR4 as a reference color, and the spot colorimetry is completed at the timing t6. In this case, since the fourth color CR4 is not a color at the end in the color group, the comparison processing unit 19 makes determination of NO in step S310 in FIG. 14, and search for a color that is not subjected to colorimetry among colors from the fourth color CR4 to the fifth color CR5 that is a color at the end in the color group in step S314. Since there is not a color that is not subjected to colorimetry, the comparison processing unit 19 makes determination of NO in step S316. Then, the comparison processing unit 19 searches for a color that is not subjected to colorimetry starting from the first color CR1 which is the color at the head in the color group in step S312, and as indicated by H60 in FIG. 20, determines that the second color CR2 that is a color next to the first color CR1 as the color that is not subjected to colorimetry. As a result, the comparison processing unit 19 makes determination of YES in step S320 in FIG. 14, and issues the first colorimetry target command in step S324. As a result, the display processing unit 20 displays the screen indicated by J60 in FIG. 23. For example, the display processing unit 20 displays the frame icon 200 in the same color as a color CM4 that was subjected to colorimetry with the fourth color CR4 as a reference color in step S642 in FIG. 19. Further, the display processing unit 20 displays the second color CR2 in the reference color region 120 based on the first colorimetry result command as indicated by J61 in FIG. 23 by step S644 in FIG. 19. In the screen indicated by J60, the first color CR1 displayed left of the first marker is the reference color for which colorimetry was performed, but it is not the reference color related to the immediately preceding colorimetry, so that the second marker is not displayed under the square region of the first color CR1 and the color CM1 that was actually subjected to colorimetry. Further, since the third color CR3, which is the reference color displayed right of the first marker, is a reference color for which colorimetry is not performed, the user recognizes that the triangle of the third color CR3 is displayed. In this way, when there is not the color that is not subjected to colorimetry after searching colors from the color that was subjected to colorimetry to the color at the end in the color group, (NO in step S316), the comparison processing unit 19 performs the process of searching colors from the color at the head in the color group to the color that was subjected to colorimetry (step S312), and when there is the color that is not subjected to colorimetry between the color at the head in the color group and the color that was subjected to colorimetry, the comparison processing unit 19 determines the color that is not subjected to colorimetry as a color to be subjected to colorimetry next. By doing this, even when colorimetry of the color at the end in the color group as a reference color is performed first, the user can be given the opportunity to reliably perform colorimetry with the color at the head in the color group as a reference color.

More specifically, for example, it is assumed that the colorimetry target command determination process (step S300) in FIG. 14 is a process in which step S316 does not exist and the process proceeds from step S314 to step S320. Then, in a case in which colorimetry of the color at the end in the color group is performed with the fourth color CR4 as a reference color in the situation indicated by H50 in FIG.

20, when the process is applied, the comparison processing unit 19 makes determination of NO in step S320 in FIG. 14, because colorimetry was performed with the fourth color CR4 and the fifth color CR5 as reference colors, and there is not a color that is not subjected to colorimetry, so that. Therefore, when the assumed process is applied, there is a problem that even though colorimetry is not performed with the second color CR2 and the third color CR3 as reference colors, the end icon is displayed in the center of the screen of the display unit 68 by step S322. In this respect, in the technique of the present embodiment, step S316 exists after step S314, and when the comparison processing unit 19 makes determination of NO in step S316, step S312 is performed. As a result, even when the user first performs colorimetry with the fifth color CR5 that is a color at the end in the color group as a reference color, and then performs colorimetry with the fourth color CR4 as a reference color, the comparison processing unit 19 searches for a color that is not subjected to colorimetry starting from the first color CR1 which is the color at the head in the color group, so that the end icon is not displayed in the center of the screen of the display unit 68.

Then, it is assumed that the user selects the colorimetry button icon of J62 in FIG. 23, performs spot colorimetry with the second color CR2 as a reference color, and as indicated by H70 in FIG. 20, the spot colorimetry is completed at the timing t7. In this case, since the second color CR2 is not a color at the end in the color group, the comparison processing unit 19 makes determination of NO in step S310 in FIG. 14, and searches for a color that is not subjected to colorimetry among colors from the second color CR2 to the fifth color CR5 that is a color at the end in the color group in step S314. As a result, the comparison processing unit 19 determines that the third color CR3 is a color that is not subjected to colorimetry, makes determination of YES in step S320, and issues the first colorimetry target command in step S324. As a result, the display processing unit 20 displays the screen indicated by J70 in FIG. 24. For example, the display processing unit 20 displays the frame icon 200 in the same color as the color CM2 that was subjected to colorimetry with the second color CR2 as a reference color in step S642 in FIG. 19. Further, the display processing unit 20 displays the third color CR3 in the reference color region 120 based on the first colorimetry result command as indicated by J71 in FIG. 24 in step S644 in FIG. 19. Further, as indicated by J72, the second marker is displayed under the square region of the second color CR2 that is the reference color related to the immediately preceding colorimetry and the color CM2 that was actually subjected to colorimetry left of the first marker.

Then, it is assumed that the user performs spot colorimetry with the third color CR3 as a reference color, and the spot colorimetry is completed at the timing t8. In this case, since the third color CR3 is not a color at the end in the color group, the comparison processing unit 19 makes determination of NO in step S310 in FIG. 14, and searches for a color that is not subjected to colorimetry among colors from the third color CR3 to the fifth color CR5 that is a color at the end in the color group in step S314. Since there is not a color that is not subjected to colorimetry, the comparison processing unit 19 makes determination of NO in step S316, and searches for a color that is not subjected to colorimetry starting from the first color CR1 that is a color at the head in the color group in step S312. Since there is not a color that is not subjected to colorimetry, the comparison processing unit 19 makes determination of NO in step S320 and issues the second colorimetry target command. As a result, the display processing unit 20 displays the screen indicated by J80 in FIG. 24. For example, the display processing unit 20 displays the frame icon 200 in the same color as the color CM3 that was subjected to colorimetry with the third color CR3 as the reference color in step S642 in FIG. 19. Further, in step S644, the end icon is displayed in the center of the display unit 68 as indicated by J81 based on the second colorimetry target command. In the screen indicated by J80, the fifth color CR5 displayed left of the end icon is the reference color for which colorimetry was performed, but is not the reference color related to the immediately preceding colorimetry, so that the second marker is not displayed under the square region of the fifth color CR5 and the color CM5 that was actually subjected to colorimetry.

Figure 24:
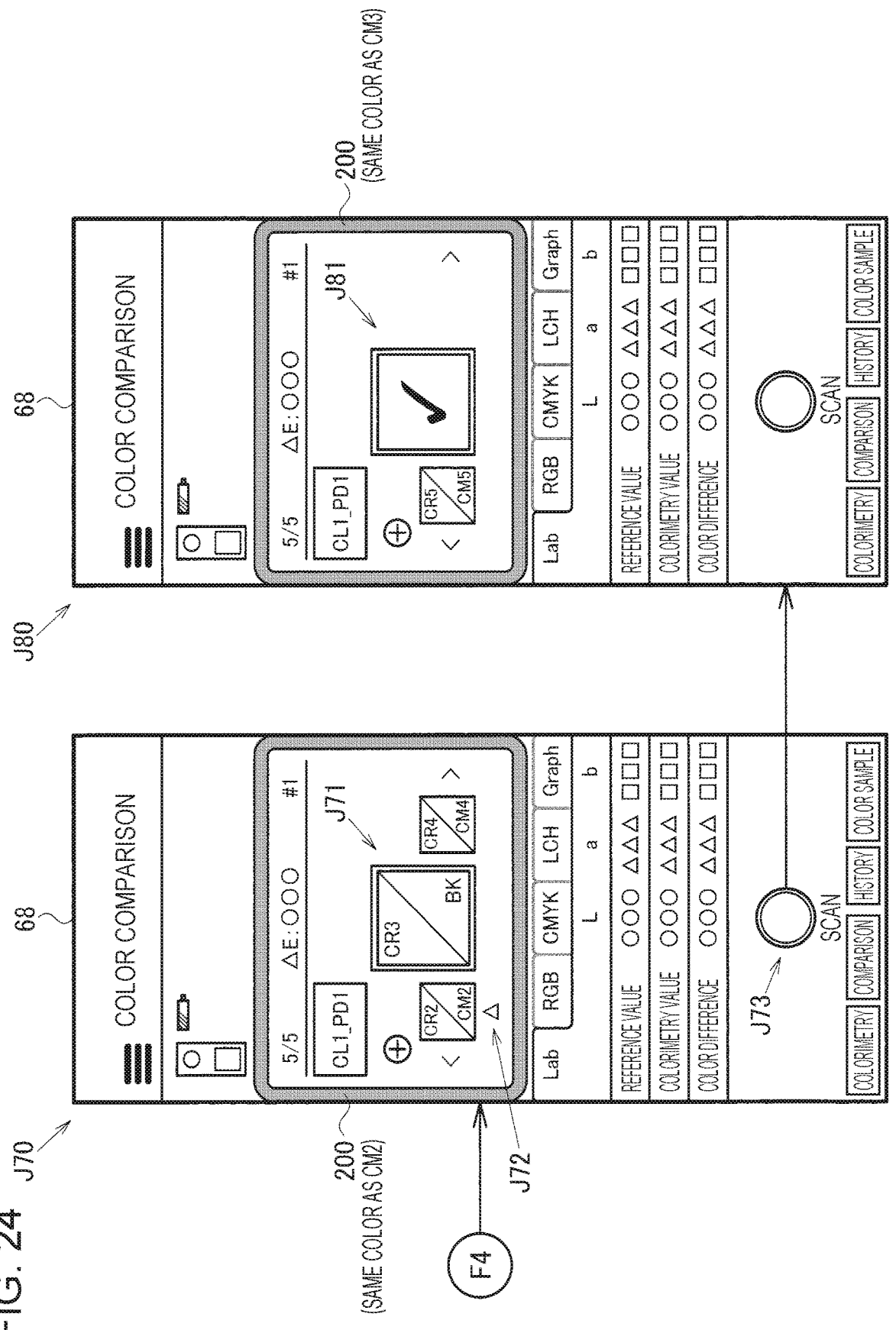
FIG. 24 is another diagram showing a screen example to which the technique of a modification is applied.
Figure 25:
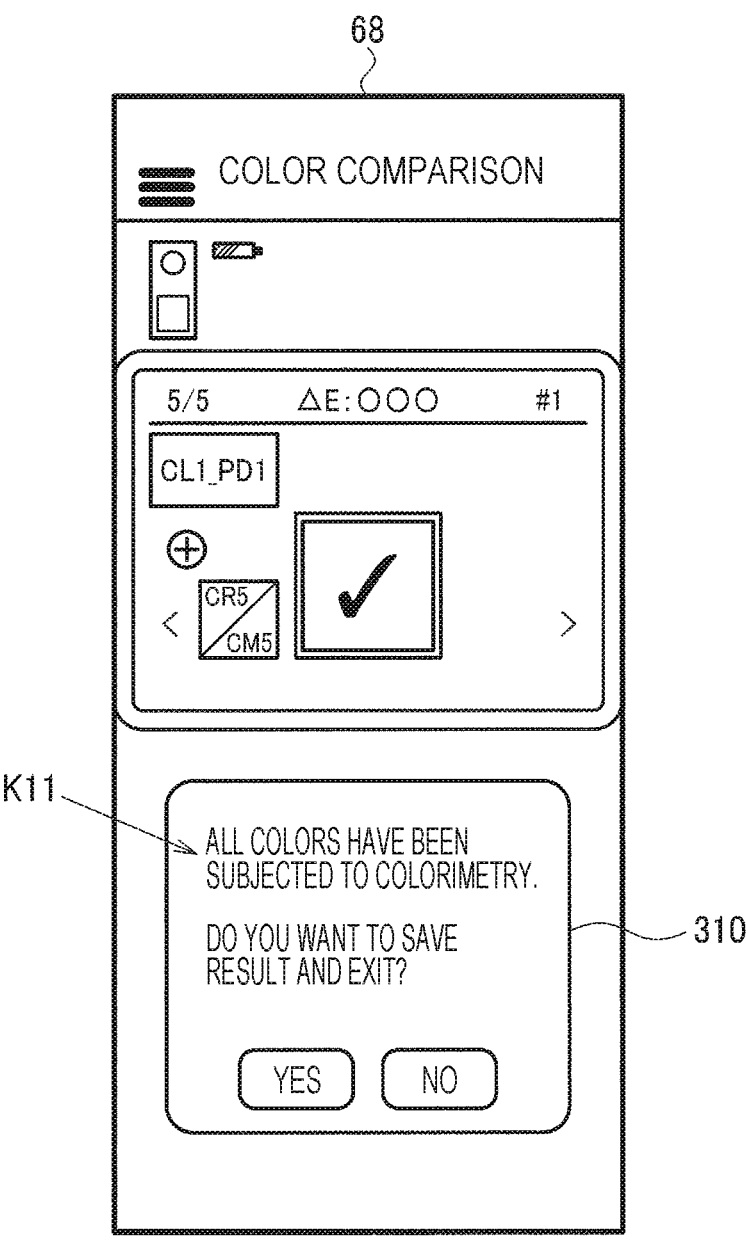
FIG. 25 is a diagram showing an example of a first confirmation screen.

Then, when the user selects the end icon indicated by J81 in FIG. 24, the display processing unit 20 makes determination of YES in step S410 in FIG. 16. Further, since all the colors have been subjected to colorimetry, the display processing unit 20 makes determination of YES in step S420, and issues the first confirmation display command in step S430. Then, the display processing unit 20 displays the first confirmation screen 310 as indicated by FIG. 25 in step S620. As indicated by K11, the user is notified of a message or the like indicating that spot colorimetry is performed by comparing all the reference colors displayed on the first confirmation screen 310.

Figure 26:
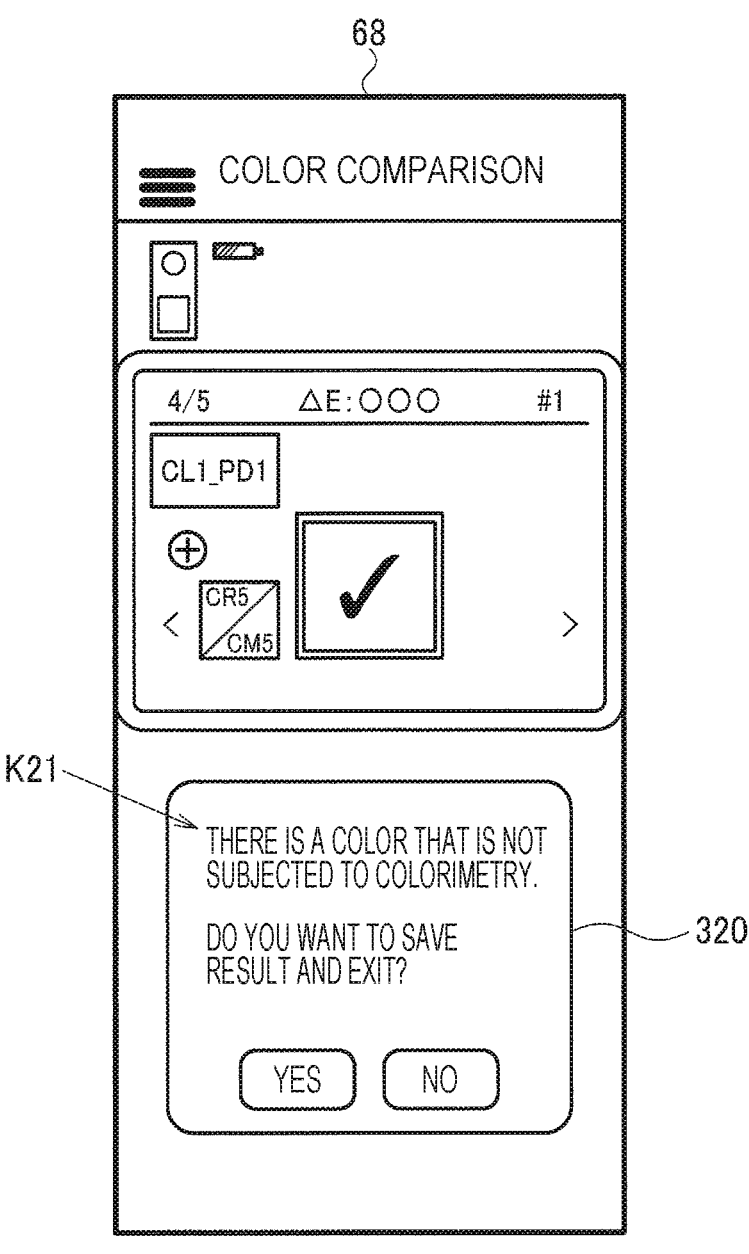
FIG. 26 is a diagram showing an example of a second confirmation screen.

FIGS. 20 to 25 are examples in which colorimetry is performed for all the reference colors. Since the colorimetric system 10 of the modification can change the reference colors as described above, for example, the user can display the end icon in the center when colorimetry of all the colors is not completed. In this case, when the user selects the end icon, the comparison processing unit 19 makes determination of NO in step S420 in FIG. 16, and issues the second confirmation display command in step S440. Then, the display processing unit 20 displays the second confirmation screen 320 as shown in FIG. 26 in step S620. As indicated by K21, a message or the like indicating that the spot colorimetry application program is about to be terminated without performing colorimetry based on all the reference colors is displayed on the second confirmation screen 320. As described above, in the colorimetric system 10 of the present embodiment, the display processing unit 20 perform a display process of displaying a message for allowing the end of colorimetry of the color group to be accepted without performing colorimetry of the color that is not subjected to colorimetry. By doing so, the user can recognize that spot colorimetry is about to be completed without performing colorimetry with all the colors belonging to the color group as the reference colors. As a result, the colorimetric system 10 can give the user an opportunity to determine whether the user has forgotten to perform colorimetry of a color that is not subjected to colorimetry as a reference color.

Figure 27:
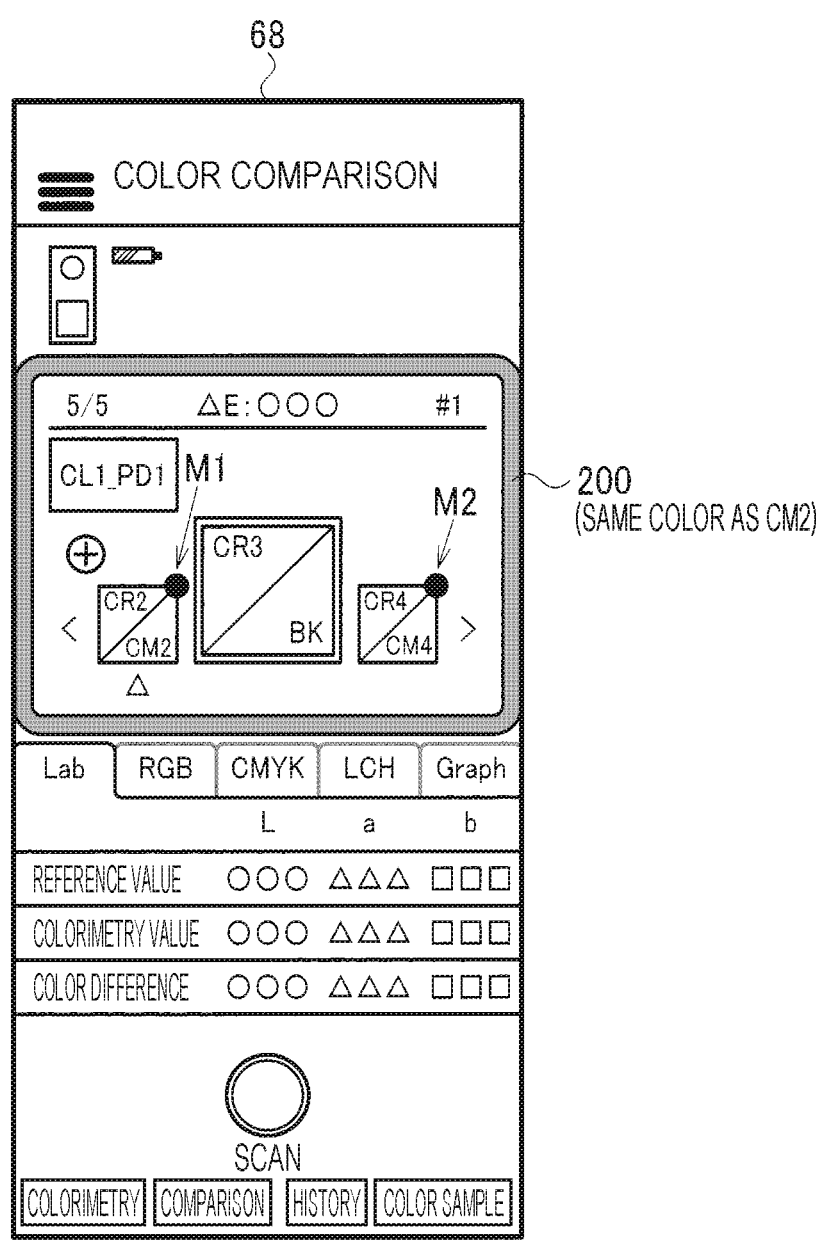
FIG. 27 is a diagram showing a screen example in another modification.

It should be noted that the technique of the present embodiment is not limited to the above, but various modifications can be implemented. For example, the screen indicated by J70 in FIG. 24 may be modified to the screen example shown in FIG. 27. Specifically, as indicated by M1, the display processing unit 20 may display a round icon attached to the upper right side of the figure related to the second color CR2 that is the reference color for which colorimetry was performed. As a result, the user can recognize that the figure on the left side of the screen is a figure based on the reference color for which colorimetry was performed. Similarly, as indicated by M2, the display processing unit 20 may display a round icon attached to the upper right side of the figure related to the fourth color CR4 which is the reference color for which colorimetry was performed. The shape of the icon is not limited to a round shape, and the position where the icon is attached is not limited to the upper right side of the figure based on the reference color. As described above, in the colorimetric system 10 of the present embodiment, the display processing unit 20 performs a display process of performing display by adding an icon indicating that colorimetry was performed for the color that was subjected to colorimetry. By doing so, it is possible to more clearly indicate to the user whether the displayed color is a color that was subjected to colorimetry. More specifically, in the screen example shown in FIG. 11 described above, as indicated by D9, the figure related to the first color CR1 which is the reference color for which colorimetry was performed is displayed left of the first marker, and the figure related to the third color CR3 which is the reference color for which colorimetry is not performed is displayed right of the first marker, so that the user may misunderstand that the screen is always displayed in this way. However, practically, for example, as in the screen of J50 in FIG. 23, the figure related to the fifth color CR5 that is the reference color for which colorimetry was performed may be displayed right of the first marker, and the figure related to the third color CR3 that is the reference color for which colorimetry is not performed may be displayed left of the first marker. Further, for example, as in the screen of J70 in FIG. 24 described above, the figure related to the reference color for which colorimetry was performed may be displayed on left and right of the first marker. In this regard, by applying the technique, it is possible to more clearly indicate whether the displayed color is a reference color for which colorimetry was performed. This prevents the user from making the above misunderstanding.

As described above, the colorimetric system of the present embodiment includes the comparison processing unit that performs a process of a comparison between the color value of the color that was subjected to colorimetry by the colorimetric unit that performs colorimetry and the color value of the reference color and the display processing unit that displays the comparison processing result by the comparison processing unit. The comparison processing unit searches for a color that is not subjected to colorimetry among colors included in the color group, and when there is the color that is not subjected to colorimetry, determines the color that is not subjected to colorimetry as a color to be subjected to colorimetry next, and the display processing unit performs a display process of displaying the color to be subjected to colorimetry next.

By doing so, when the user forgets to perform colorimetry on some of the colors in the color group, the user can recognize the color that is not subjected to colorimetry.

Further, when there is colors that are not subjected to colorimetry, the comparison processing unit may determine the color at the head in the color group among the colors that are not subjected to colorimetry as the color to be subjected to colorimetry next.

By doing so, when there is a plurality of colors that is not subjected to colorimetry, it is possible to determine which color is to be the color to be subjected to colorimetry next.

In a case in which the comparison processing unit determines that the color group includes a color that is not subjected to colorimetry when the color at the end in the color group was subjected to colorimetry, the display processing unit may perform a display process of displaying the color that is not subjected to colorimetry as the color to be subjected to colorimetry next.

By doing so, the user can recognize the existence of the color that is not subjected to colorimetry before attempting to finish the spot colorimetry.

Further, the comparison processing unit may determine, as the color to be subjected to colorimetry next, the color that is not subjected to colorimetry among colors from the color next to the color that was subjected to colorimetry in the color group to the color at the end in the color group.

By doing so, it is possible to search for a color that is not subjected to colorimetry in order from the color at the head in the color group.

In addition, when there is not the color that is not subjected to colorimetry after searching colors from the color that was subjected to colorimetry to the color at the end in the color group, the comparison processing unit may perform the process of searching colors from the color at the head in the color group to the color that was subjected to colorimetry, and when there is the color that is not subjected to colorimetry between the color at the head in the color group and the color that was subjected to colorimetry, the comparison processing unit may determine the color that is not subjected to colorimetry as a color to be subjected to colorimetry next.

By doing this, even when colorimetry of the color at the end in the color group as a reference color is performed first, the user can be given the opportunity to reliably perform colorimetry with the color at the head in the color group as a reference color.

Further, the display processing unit may perform a display process of performing display by adding an icon indicating that colorimetry was performed with respect to a color that was subjected to colorimetry.

By doing so, it is possible to more clearly indicate to the user whether the displayed color is a color that was subjected to colorimetry.

Further, the display processing unit may perform a display process of performing display so that forming a predetermined figure in the color that was subjected to colorimetry and the reference color indicates that colorimetry was performed.

By doing so, the user can recognize that the reference color related to the color constituting the predetermined figure is the color that was subjected to colorimetry.

In addition, the colorimetric system may include the reception unit that receives an operation from the user, and when the reception unit is displaying the color to be subjected to colorimetry next, the reception unit may receive a predetermined operation that allows the color to be subjected to colorimetry further next to be selected.

By doing so, the user can reselect the color to be subjected to colorimetry next even when the color to be subjected to colorimetry next is determined once.

Further, the reception unit may accept an operation of skipping a colorimetry order as a predetermined operation.

By doing so, the user can freely set the reference color for spot colorimetry even when the order of display of the reference color for spot colorimetry is determined.

Further, the display processing unit may perform a display process for displaying a message for allowing an end of colorimetry of the color group to be accepted without performing colorimetry of the color that is not subjected to colorimetry.

By doing so, the user can recognize that spot colorimetry is about to be completed without performing colorimetry with all the colors belonging to the color group as the reference colors.

Further, the terminal device of the present embodiment includes a terminal comparison processing unit that performs a process of a comparison between the color value of the color that was subjected to colorimetry by the colorimeter that performs colorimetry and the color value of the reference color and a terminal display processing unit that displays the comparison processing result by the terminal comparison processing unit. The terminal comparison processing unit searches for a color that is not subjected to colorimetry among colors included in the color group, and when there is the color that is not subjected to colorimetry, determines the color that is not subjected to colorimetry as a color to be subjected to colorimetry next, and the terminal display processing unit performs a process of displaying the color to be subjected to colorimetry next.

In addition, the processing method of the present embodiment includes a comparison process of comparing the color value of the color that was subjected to colorimetry by the colorimetric unit that performs colorimetry with the color value of the reference color, a display process of displaying the comparison processing result by the comparison process, a process of searching for a color that is not subjected to colorimetry among colors included in the color group, and when there is the color that is not subjected to colorimetry, determining the color that is not subjected to colorimetry as the color to be subjected to colorimetry next, and a display process of displaying the color to be subjected to colorimetry next.

Further, the program of the present embodiment causes the computer to activate as the comparison processing unit that performs a process of a comparison between the color value of the color that was subjected to colorimetry by the colorimetric unit that performs colorimetry and the color value of the reference color, and the display processing unit that displays the comparison processing result by the comparison processing unit. The comparison processing unit searches for a color that is not subjected to colorimetry among colors included in the color group, and when there is the color that is not subjected to colorimetry, determines the color that is not subjected to colorimetry as a color to be subjected to colorimetry next, and the display processing unit performs a display process of displaying the color to be subjected to colorimetry next.

Although the present embodiment is described in detail as described above, those skilled in the art will easily understand that many modifications that do not substantially deviate from the new matters and effects of the present embodiment are possible. Therefore, all such modifications are included in the scope of the present disclosure. For example, a term described at least once in a specification or drawing with a broader or synonymous different term may be replaced by that different term anywhere in the specification or drawing. All combinations of the present embodiment and modifications are also included in the scope of the present disclosure. Further, the configuration/operation of the colorimetric system, the terminal device, the processing method, the program, and the like is not limited to those described in the present embodiment, but various modifications can be implemented. For example, the colorimetry device and the processing device that communicates with the colorimetry device and acquires the colorimetry result may be an integrated device or independent devices. Further, the content displayed in the present embodiment may be notified to the user by a method other than the display such as voice.

What is claimed is:

1. A colorimetric system comprising:

a colorimetric sensor that performs colorimetry based on a color group of reference colors arranged in a specific order; and a processor that compares a color difference between a color value measured by the colorimetric sensor and a color value of a reference color, and determines whether the color difference is smaller than a given value, wherein the processor sets a completion flag for a measured color, when the processor detects a plurality of colors without the completion flag within the color group, the processor determines a target color to be subjected to colorimetry next among the plurality of colors without the completion flag, according to the specific order, and performs a display process by displaying a user interface, in which a next colorimetry of the target color and a color that was subjected to colorimetry immediately before are displayed, and the color difference is displayed in the user interface.

2. The colorimetric system according to claim 1, wherein when the processor detects the plurality of colors without the completion flag after a color at an end of the specific order in the color group was subjected to colorimetry, the colorimetric system notifies of the color without the completion flag as the target color to be subjected to colorimetry next.

3. The colorimetric system according to claim 1, wherein when the processor detects the plurality of colors without the completion flag that include an earlier color and a later color in the specific order than a color measured most recently, the processor determines the later color as the target color.

4. The colorimetric system according to claim 1, wherein the processor performs a display process of displaying in the user interface by adding an icon indicating that colorimetry was performed with respect to the color that was subjected to colorimetry.

5. The colorimetric system according to claim 1, wherein the processor performs a display process of displaying in the user interface so as to indicate that colorimetry was performed by forming a predetermined figure with the color that was subjected to colorimetry and the reference color.

6. The colorimetric system according to claim 1, wherein the processor is further configured to receive operations from a user, and when the color to be subjected to colorimetry next is displayed, the processor receives a predetermined operation that allows a color to be subjected to colorimetry further next to be selected.

7. The colorimetric system according to claim 6, wherein the operations include an operation of skipping a colorimetry order as the predetermined operation.

8. The colorimetric system according to claim 1, wherein the processor performs a display process of displaying in the user interface a message for allowing an end of colorimetry of the color group to be accepted without performing colorimetry of the color that is not subjected to colorimetry.

9. A terminal device comprising:

a processor that acquires a color value of a color that was subjected to colorimetry from a colorimeter that performs colorimetry based on a color group of reference colors arranged in a specific order, wherein the processor compares the color value of the color that was subjected to colorimetry with a color value of a reference color and notifies a user of a comparison processing result, the processor sets a completion flag for a measured color, and when the processor detects a plurality of colors without the completion flag within the color group, the processor notifies a target color to be subjected to colorimetry next among the plurality of colors without the completion flag, according to the specific order, and performs a display process by displaying a user interface, in which a next colorimetry of the target color and a color that was subjected to colorimetry immediately before are displayed, and the comparison processing result is displayed in the user interface.

10. A non-transitory computer-readable storage medium storing a program, the program causing a computer to execute as:

a processor that acquires a color value of a color that was subjected to colorimetry from a colorimetric unit that performs colorimetry based on a color group of reference colors arranged in a specific order, wherein the processor compares the color value of the color that was subjected to colorimetry by the colorimetric unit with a color value of a reference color, the processor sets a completion flag for a measured color, and when the processor detects a plurality of colors without the completion flag within the color group, the processor notifies a target color to be subjected to colorimetry next among the plurality of colors without the completion flag, according to the specific order, and performs a display process by displaying a user interface, in which a next colorimetry of the target color and a color that was subjected to colorimetry immediately before are displayed, and a comparison processing result is displayed in the user interface.

* * * * *